United States Patent [19]

Thompson

[11] Patent Number: 5,225,987
[45] Date of Patent: Jul. 6, 1993

[54] SYSTEM FOR IMPLEMENTING A PC COMPUTER CONFIGURATION SYSTEM FOR ASSEMBLING AND MOUNTING OF A COMPLEX PRODUCT IN SITU

[75] Inventor: Timothy F. Thompson, Monroeville, Pa.

[73] Assignee: Westinghouse Electric Corp., Pittsburgh, Pa.

[21] Appl. No.: 703,425

[22] Filed: May 20, 1991

[51] Int. Cl.$^5$ .................. G06F 15/46; G06F 15/60
[52] U.S. Cl. ................ 364/468; 364/474.24; 364/512; 395/921; 395/923; 395/161
[58] Field of Search ............ 364/468, 474.24, 512, 364/191–193, 578, DIG. 2, 401, 402; 395/919, 920, 921, 922, 923, 50, 62, 119, 120, 141, 142, 143, 161, 500

[56] References Cited

U.S. PATENT DOCUMENTS

| | | | |
|---|---|---|---|
| 4,068,298 | 1/1978 | Dechant et al. | 395/425 |
| 4,641,274 | 2/1987 | Swank | 395/200 |
| 4,656,602 | 4/1987 | Berkland et al. | 395/275 |
| 4,700,317 | 10/1987 | Watanabe et al. | 395/921 X |
| 4,754,409 | 6/1988 | Ashford et al. | 395/11 |
| 4,870,591 | 9/1989 | Cicciarelli et al. | 364/468 |
| 4,962,472 | 10/1990 | Seki et al. | 395/161 |
| 4,964,060 | 10/1990 | Hartsog | 364/512 |
| 5,006,991 | 4/1991 | Ohcoshi et al. | 364/512 X |

Primary Examiner—Joseph Ruggiero
Attorney, Agent, or Firm—M. J. Moran

[57] ABSTRACT

A generic tool is provided by storing into a PC computer data representing structurally a vertical section and objects to be placed inside the vertical section, and by manipulating virtually with the PC computer selected objects in relation to cases within the vertical section while testing the physical compatibility, so as to build a feasible product configuration to be visually shown by the PC computer as an aid in the actual installation manually of the product with actual such objects and vertical section, for instance to build up a panelboard.

9 Claims, 18 Drawing Sheets

FIG. 8
PRIOR ART

PANELBOARD REPRESENTATION

| VERTICAL SECTIONS | ROWS | COLUMNS | DEPTH | BUS MATERIAL | BUS RATING | VOLTAGE | VS # | PART-OF VS |
|---|---|---|---|---|---|---|---|---|
| VS 1 | 10 | 2 | 1 | CV | 400 | 480 | 0 | — |
| SUBCHASSIS | 6 | 2 | 1 | AL | 400 | 480 | 1 | 0 |

| DEVICES | VS # | ROW | COLUMN | DEPTH | HEIGHT | WIDTH | AMPS | POLES | FRAME |
|---|---|---|---|---|---|---|---|---|---|
| DEVICE 1 | 0 | 0 | 0 | 0 | 3 | 2 | 150 | 3 | F |
| DEVICE 2 | 0 | 3 | 0 | 0 | 1 | 1 | 150 | | |
| DEVICE 3 | 0 | 3 | 1 | 0 | 1 | 1 | 20 | | |
| DEVICE 4 | 0 | 4 | 0 | 0 | 2 | 1 | 20 | | |
| DEVICE 5 | 1 | 0 | 0 | 0 | 3 | 1 | 20 | | |
| DEVICE 6 | 1 | 3 | 1 | 0 | 3 | 1 | 50 | | |

DEV = GET-DEVICE-POINTER (VS, ROW, COL)

PUT-DEVICE-POINTER (VS, ROW, COL, DEV)

PUT-AV (AV, NAME, VALUE)

```
Panelboard Vertical Section Data

G.O.: NCMAIN          Item: 001    Panel Type: PRL4B    Tech:           CA/MI MI Cable Entry: TOP                    Main Device Type: MCB Quantity:  1      Panel Marking: DIST          Rev: 1      Date:

Service Volt: 480Y/277v        Phase: 3    Wire: 4    Amps: 800    N Amps: 1200

Bus: CU           Grd Bus (Y/N): std           N.P.: MASTIC

Lug Size: 500     Lug Type: MEC                S.C.I.C.: 25

Service Entrance (Y/N): no         Ground Fault (Y/N): no

Trim: std                          Special Box (Y/N): no
                                   Interior Only (Y/N): no
Main Device Rating: 800            UL Label: CTL NONCTL
                                           Corporation:
```

FIG. 11

```
GO #: NCMAIN            Item #: 001         Panel Type: PRL4B

Required AIC Rating: 25  (KAmps)            Service: 480Y/277v
Main Bus Current:    800 (Amps)             Main Device Type: MCB BRANCH DEVICES
   QTY  AMPS   POLES   STR   SPC   FRAME
1   1    400     3     [N]   [N]   [MC  ]
2   2    100     2     [N]   [N]   [JD  ]
3   2    125     3     [N]   [N]   [JD  ]
4   3    125     3     [N]   [N]   [KD  ]
5   6     20     1     [N]   [N]   [FD  ]
6   4     30     2     [N]   [N]   [FD  ]

MAIN DEVICE
   QTY  AMPS   POLES   STR         FRAME
    1    800     3     [N]         [MC  ]

Total circuits: 54
```

FIG.12

| PANELBOARD CA DRAWING | | SERVICE VOLTAGE - 3 PHASE 4 WIRE 480Y_277V |
|---|---|---|
| 1X — MC 3P 800A | | CHASSIS BUS - 800 COPPER |
| 2X — MC 3P 400A | | NEUTRAL RATING - 1200 AMP |
| 3X — JD 2P 100A | JD 2P 100A — | PRL4B/PRL4F CHASSIS |
| 4X — JD 3P 125A | JD 3P 125A — | |
| 5X — KD 3P 125A | | |
| 6X — KD 3P 125A | KD 3P 125A — | |
| 7X — FD 1P 20A | FD 1P 20A — | |
| 8X — FD 1P 20A | FD 1P 20A — | |
| 9X — FD 1P 20A | FD 1P 20A — | |
| 10X — FD 2P 30A | FD 2P 30A — | |
| 11X — FD 2P 30A | FD 2P 30A — | |
| 12X — FD 3P 40A | FD 3P 40A — | |
| 13X — FD 3P 40A | FD 3P 40A — | |
| 14X — FD 3P 40A | FD 3P 40A — | |
| 15X — 8X SPACE | | |

| ORDER | ITEM | PNL TYPE | QTY |
|---|---|---|---|
| NCMAIN | 801 | DIST | 1 |
| MARKING | REV 1 | TECH | DATE |

FIG.13

SYSTEM FOR IMPLEMENTING A PC COMPUTER CONFIGURATION SYSTEM FOR ASSEMBLING AND MOUNTING OF A COMPLEX PRODUCT IN SITU

RELATED APPLICATIONS

Two commonly owned patent applications have been filed concurrently on Apr. 27, 1990 as follows:

1. "Method and System with Reduced Memory Requirements for Implementing Expert Software Systems" filed under Ser. No. 514,911 in the names of Timothy F. Thompson, Carol A. Parsons, David M. Tinley and Leslie M. Collins; and 2. "Electronic Form Data Entry System" filed under Ser. No. 515,817 in the names of Timothy F. Thompson, William J. Di Paolo, Carol A. Parsons and David M. Tinley.

These two applications are hereby incorporated by reference.

BACKGROUND OF THE INVENTION

1. Field of Invention

This invention relates to a method and a system for providing a descriptive recitation amounting to specific instructions to be followed at a given location for manual mounting and assembling of parts to build up a product of complex configuration in situ.

2. Background

There is a need for selecting, mounting and assembling parts at a given location in order to create and build up a general installation operable as a complex product, that it be a machine (like a car, or a truck), a panelboard (for housing and setting together circuit breakers, or motors, with their associated means of control, instruments, lights, alarms, and line terminals therein) or a warehouse facility (with its stored units properly and orderly disposed and distributed). Such an installation requires a facility for storing, for physically placing and disposing, at different depths or levels, the intended mechanical or electrical parts and devices, for interconnecting the same according to a general plan and operative configuration. This requires also an identification of each element according to its physical characteristics, its functional character. Specific instructions must provide locally the capability of selection and the specific recognition as to where, how and why such an element, this at every step, when selecting, mounting and interconnecting one element with another manually at the assigned location.

The conventional way would be to use a visual and handy list of instructions containing information describing the physical setting, indicating what particular element is to be placed, and how and where.

SUMMARY OF THE INVENTION

In contrast, the present invention calls for a generic tool in the form of an expert system established in software that can be used on a PC computer to solve the many and complicated problems involved locally if it were done only by human means. This approach leads to a faster and more reliable handling when manipulating parts, devices, units, and putting them manually together to build a complex product.

An installation is planned to be installed at a given location by assembling and interconnecting many different parts within a prescribed available space having external inputs and outputs. Those parts will include dimensionally and functionally defined devices needed in at least a definite number and according to well stated attribute values, as well as complementary parts required for final assembling.

For the purpose of enabling the operation of installing equipment in such a context, the customer will draft a project specifying and listing all the necessary elements, plus the contextual facilities and limitations to be accounted for in putting together the product of complex configuration involved. Based on such a project, according to the present invention, a generic tool is established by a software expert with data that can be made directly available to the order engineer on a PC Computer expressing, without software sophistication, which parts, which devices, are to be selected and assembled and which complementary part should be ordered according to the specific instructions so received. As a result, the order engineer will be able to proceed in an orderly and sure way in placing the devices correctly and operatively within the context of the available space and means for an actual installation under the drafted project.

A generic tool in software form has been conceived which is applicable to any number of assembled products having a common generic vertical structure accommodating any possible combination of internal blocks or devices which are specifically identified by their own characteristics, structurally or functionally. The generic tool is a set of software groups and subgroups specifying at each stage the elements to be manipulated and assembled within a theoretical global vertical structure. The generic tool is, thus, an abstract complex configuration representing an assembled product in its broadest spatial, structural and functional sense and it allows, for each particular application, the system to be narrowed down by calling specific features as needed at the in-plant order level. More generally, the invention is applicable: to a machine; to a mechanical, or electrical, apparatus or system; to panelboards, switchboards, or motor control centers; to a warehouse and its stored articles; to office furniture at the supply, or at the demand end; to marketing and sales for negotiation; to a plurality of consulting advices or requests; and the like.

BRIEF DESCRIPTION OF THE DRAWINGS

FIG. 8 is a conventional panelboard representation for a complex product such as shown in FIGS. 5 and 7;

FIG. 11 is an illustration of how data representing the panelboard vertical section of FIG. 7 can be arranged in accordance with the present invention;

FIG. 12 is a data representation regarding installed devices in the context of FIG. 12;

FIG. 13 illustrates on the screen of a PC computer the resulting internal organization of a panelboard like the one of FIGS. 5 and 7 in relation to data representation of the type shown in FIGS. 11 and 12.

DESCRIPTION OF THE PREFERRED EMBODIMENT

Figure 1:
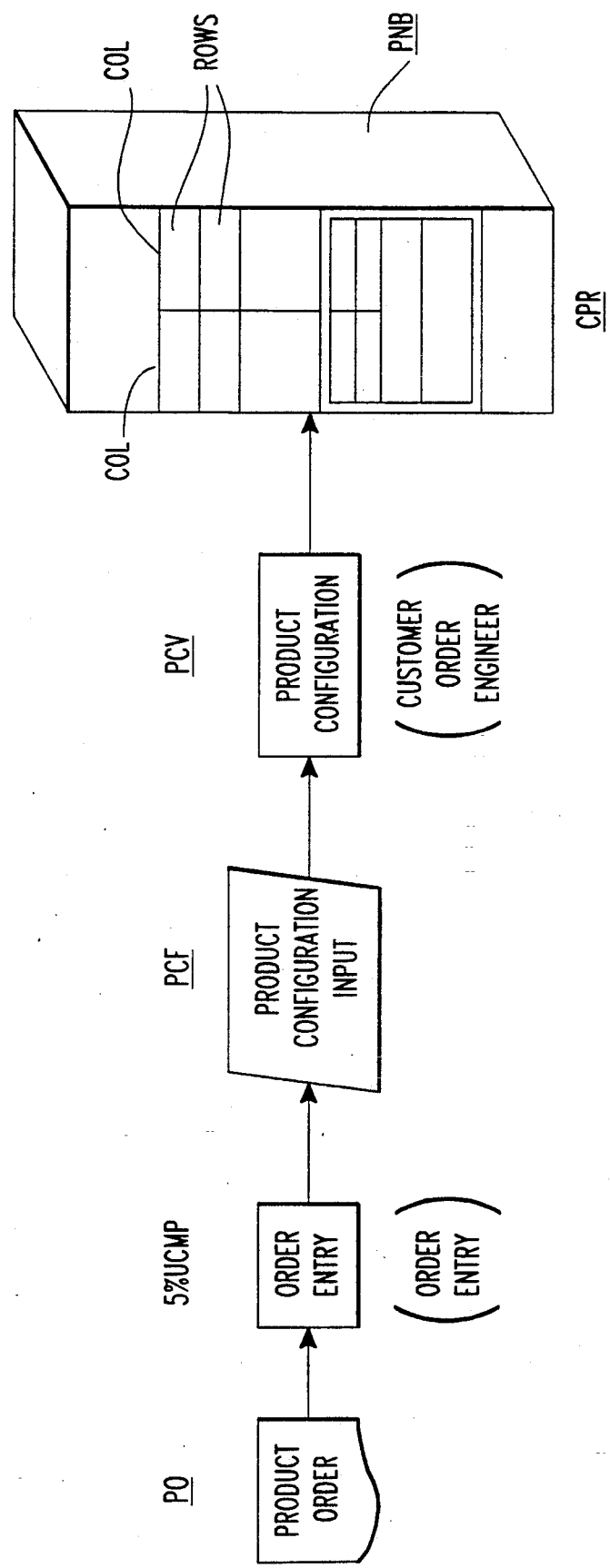
FIG. 1 is a schematic representation of the PC computer-aided system according to the invention for assembling a complex product by reference to a computer-generated product configuration.
Figure 2:
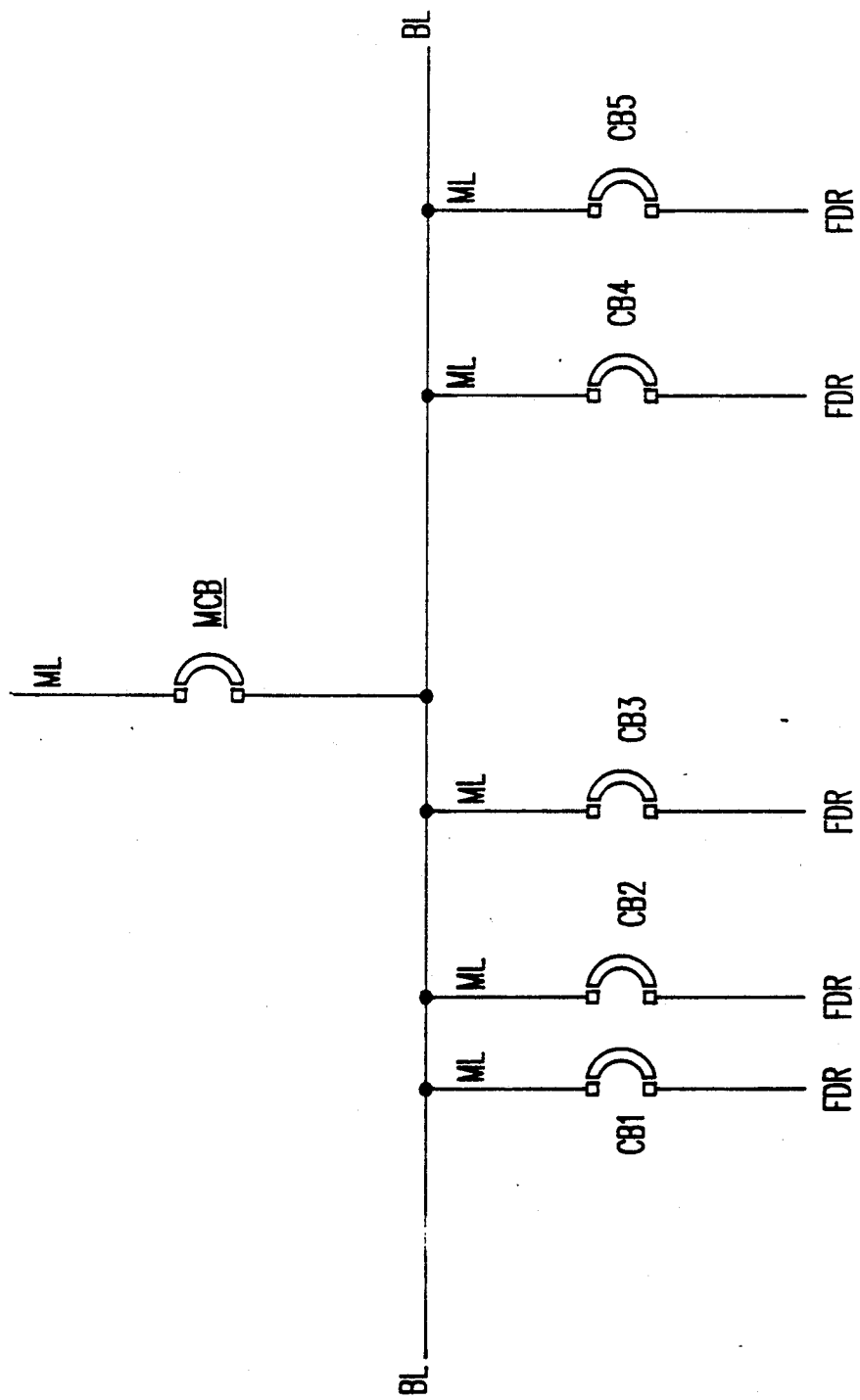
FIGS. 2 and 3 are two examples illustrating power lines and feeders with circuit breakers forming the infrastructure for a panelboard to be installed according to the present invention.

Referring to FIG. 1, the system according to the present invention is illustrated by a chain of blocks leading, from a product order PO by the customer entered at CMP into a PC computer, to a configured product CPR which is assembled within a panelboard PNB by the order engineer in accordance with the product configuration PCF presented to him on the screen of the PC computer at PCV. The expert in computer treatment will receive the order (PO) and enter on the PC computer at CMP all data required by the order. The input data PCF to the product configuration process will first be analytically established in the PC computer in software form with the entered data from CMP. Thereafter, such analytical product configuration will be translated at PCV into a visual product configuration on the screen of the PC computer for later use by the order engineer. As will be seen hereinafter, the configured product CPR will be assembled so as to match the input data PCF to the product configuration process given by the personal computer, in terms of columns (col) and rows (rows) made available in the vertical section (VS) of the panelboard PNB, and in terms of the devices to be inserted and attached therein (switch breakers, voltmeters, amperemeters, ... ). As an example of an order, FIG. 2 shows a main line ML, with a main circuit breaker MCB inserted, and several feeder lines FDR derived from a common bus BL with individual circuit breakers CB1 to CB5.

Figure 3:
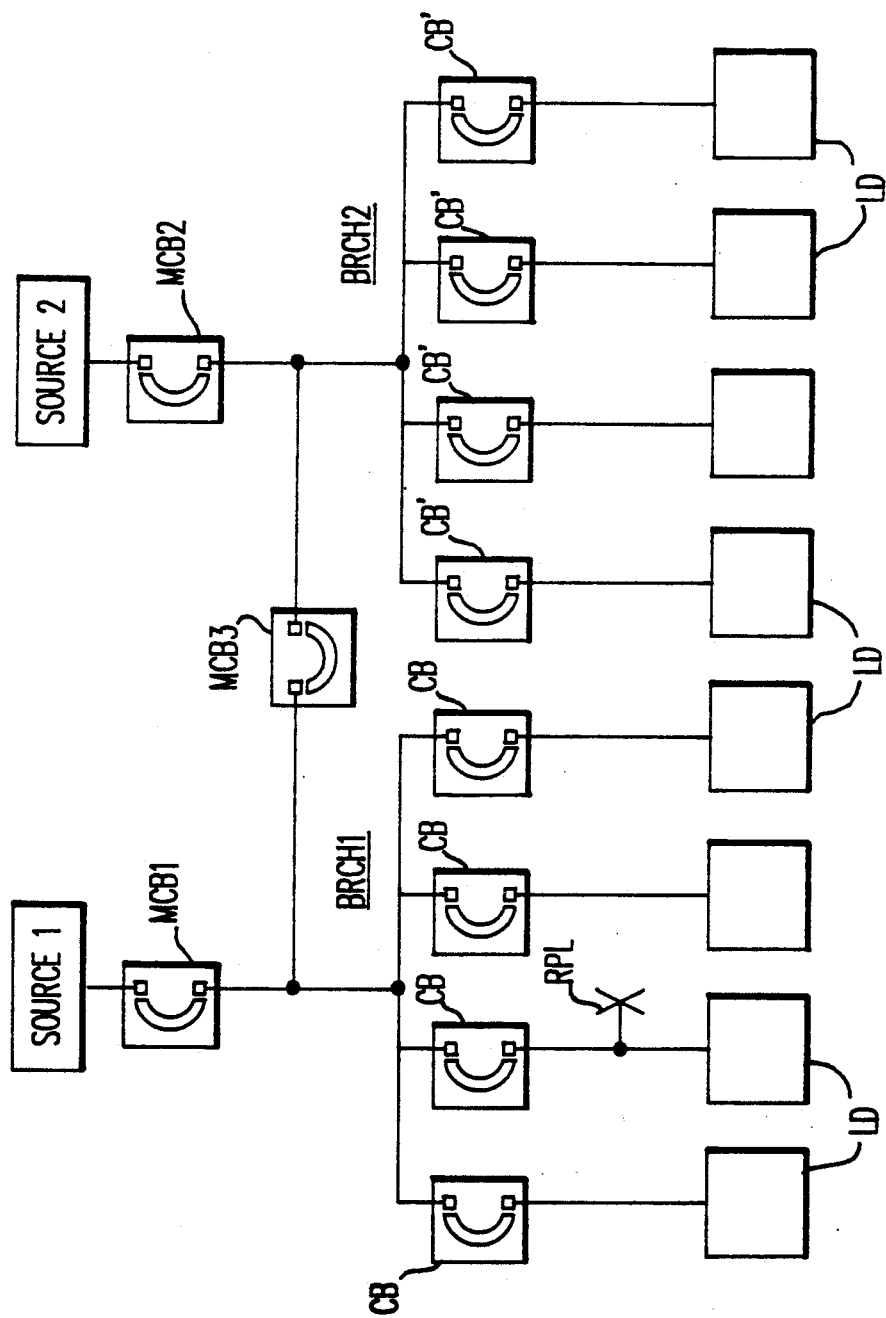

FIG. 3 shows two sources (Source #1 and Source #2) leading through separate main circuit breakers (MCB1 and MCB2) to respective branches (BRCH1 and BRCH2) with several feeders leading to individual loads LD through corresponding circuit breakers (CB for branch BRCH1, CB' for branch BRCH2). A complete disclosure of circuitry and the associated equipment regarding FIG. 2 is to be found in U.S. Pat. No. 4,476,511. Accordingly, this patent is hereby incorporated by reference.

Figure 4:
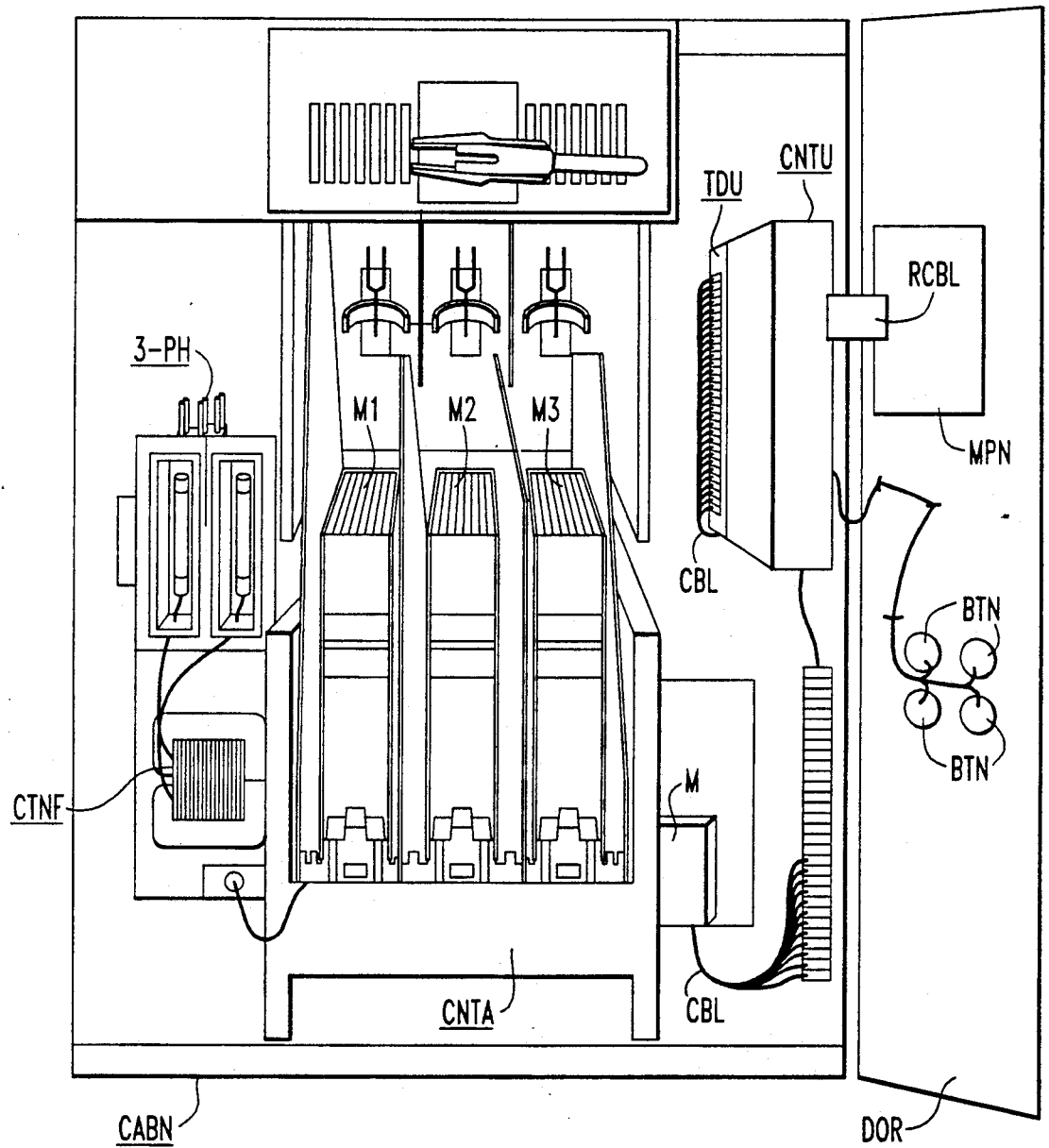
FIG. 4 relates to a cabinet, with equipment mounted inside and shown with open doors, for a contactor assembly as can be installed according to the present invention.

FIG. 4 illustrates a motor controller assembly CNTA installed in a cabinet CABN, shown with a door DOR swung open, and containing electrical equipment. Within the cabinet are centrally disposed three serially connected main line contactors M1, M2, M3 (to be interconnected with a three-phase electrical system) standing on a frame which can be rolled into or out of the cabinet. At the top of the cabinet is a control handle HND accessible from the front. To the left of the contactors, there is a current transformer CTNF and to the right a main contactor coil M with cables CBL associated with a control unit CNTU and a resistance temperature detector unit TDU. The open door DOR is shown with a front panel MPN and start, as well a stop buttons BTN. A multi-wire flat ribbon cable RCBL interconnects the front panel MPN with control unit CNTU. From this cabinet internal organization it appears that the engineer assigned to install the equipment in the cabinet according to the customer's order must be able to identify what he needs, recognize what space is available, provide means for mechanically mounting and electrically connecting the devices. It is the object of the present invention to enable with a PC Computer the order engineer to sort out and manipulate parts, and therefrom to assemble and effectively build up an installation which will match the overall configuration of the intended product. To this effect, the software expert provides the engineer with a readily understood representation of the product figuratively assembled for practical use in relation to the specification of the customer's order. All the necessary complementary parts can be obtained, either directly from the shelves or ordered from a workshop so as to lead to what is shown on FIG. 4 as an actual cabinet, for illustration purpose.

Figure 5:
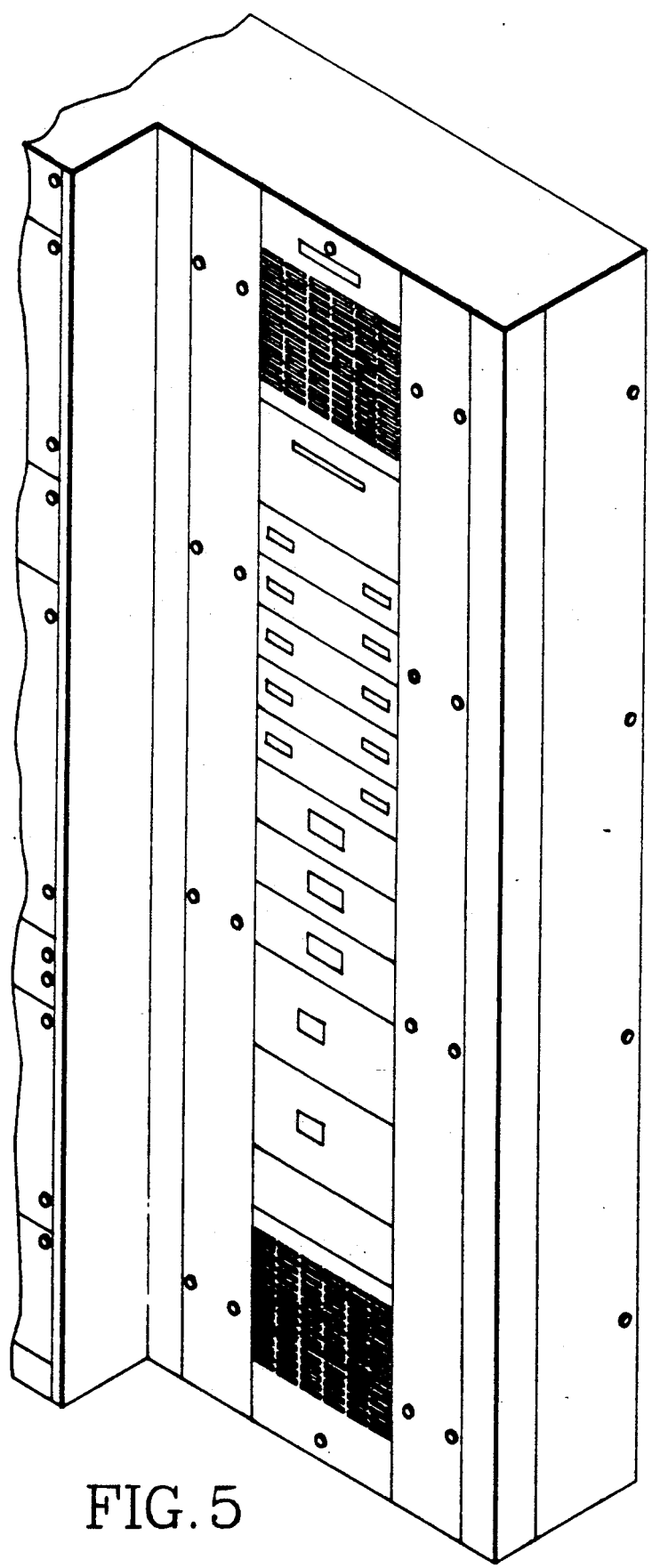
FIG. 5 illustrates a panelboard with circuit breakers distributed at different floors using one or more floors, as well as one or two columns of the available space.
Figure 6:
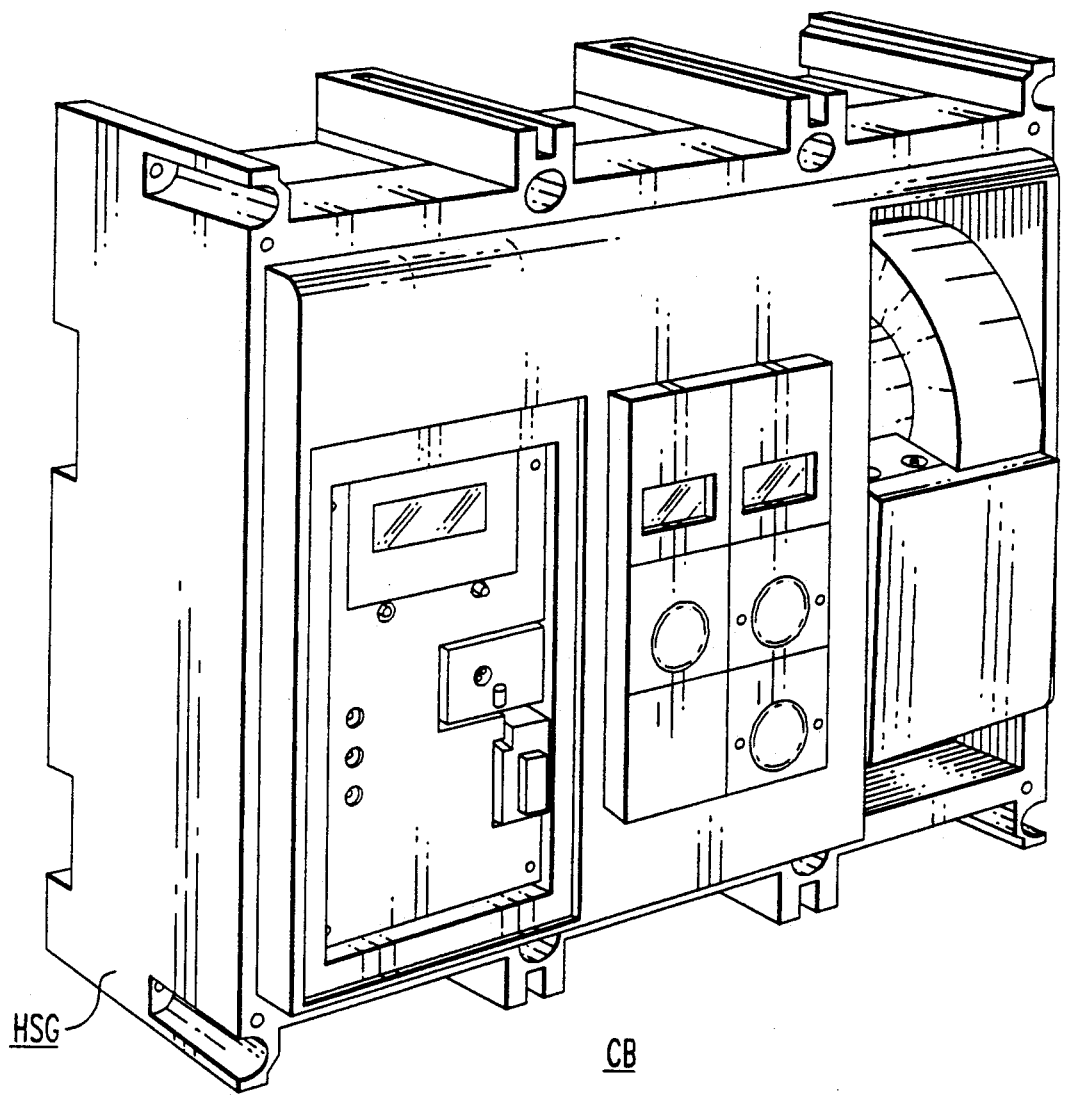
FIG. 6 shows a molded circuit breaker as could be used with the panelboards of FIG. 4.

FIG. 5 gives an outside look of the front panel of a panel board containing a series of superposed "rows" distributed across two vertical "columns". Such a spatial relationship will be called hereinafter a Vertical Section. Circuit breakers appear on the front panel occupying one or more rows and belonging to a single, or to two columns. This is one of the tasks of the order engineer to be able to recognize whether a particular circuit breaker fits within the space available, and to choose the grouping of circuit breakers to accommodate all of them in the space defined by rows and columns. FIG. 6, which has been taken from incorporated-by-reference U.S. Pat. No. 4,476,511, shows a typical circuit breaker CB as could be placed with its own molded case, or housing, HSG within the panelboard of FIG. 5.

The generic tool according to the invention will now be described and illustrated by reference to FIG. 7 as being the complex configuration of a panelboard for circuit breakers. Accordingly, as in a conventional panelboard, objects, parts and instruments are assembled, placed, mounted, connected, and held at various locations, behind a front panel, with, or without, a door. The locations exist on rows at several levels, forming compartments which may be extending vertically over several rows and which horizontally may be side-by-side with another compartment.

Figure 7:
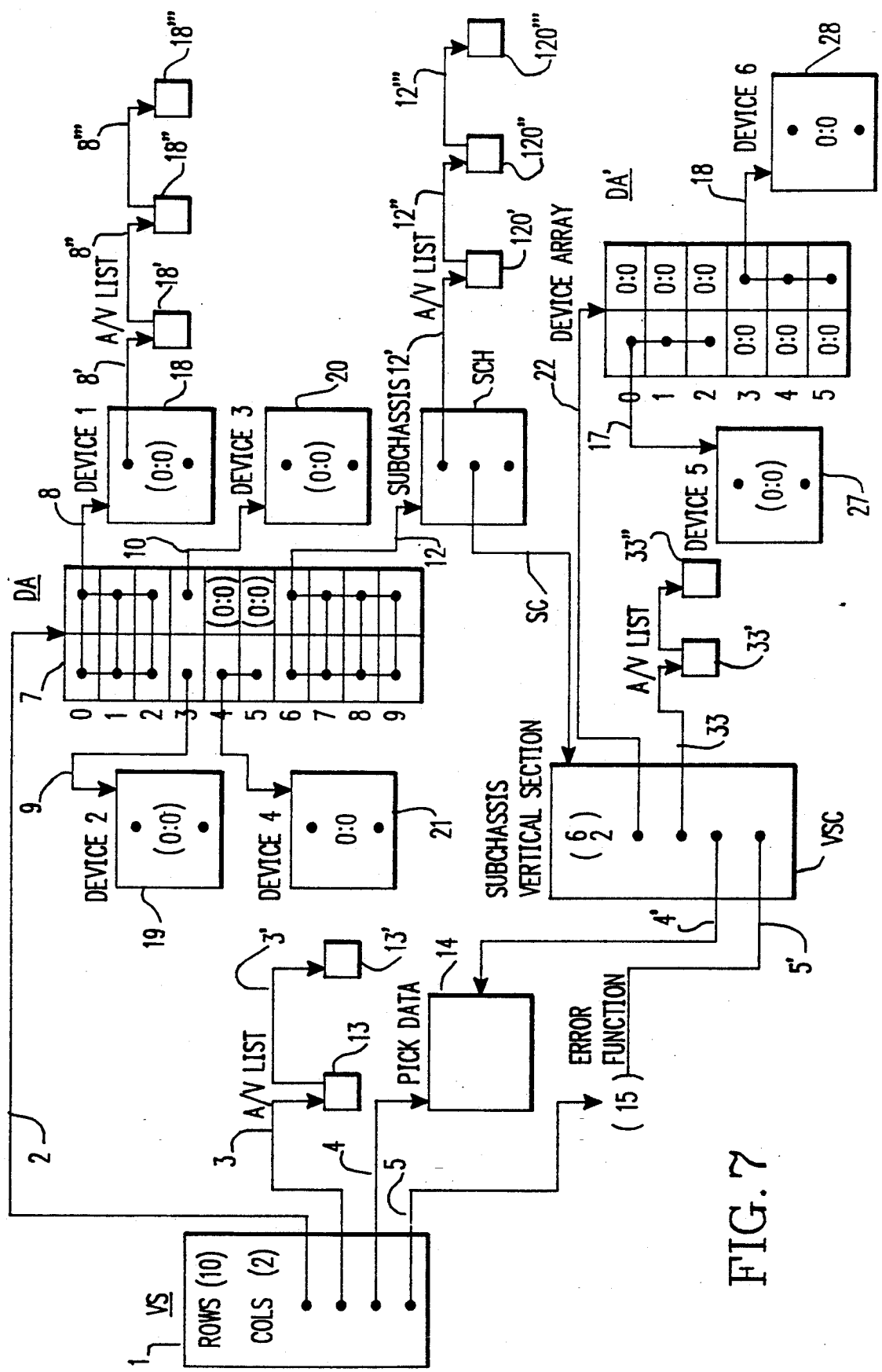
FIG. 7 illustrates the internal organization of a complex product configuration established according to the present invention in the context of a panelboard like the one shown by FIG. 5.

FIG. 7 is an internal representation relative to the panelboard of FIG. 4. At 1 is shown a "vertical section" VS. "Vertical Structure" is a generic term used to describe a structural, physical and spatial environment for the elements and parts to be placed, attached and functionally ordered therein. For the panelboard of FIG. 7, like the one of FIG. 5, it consists of two "columns" and ten "rows" configuration. There would be a different vertical section for another panelboard, and certainly a different one for a motor control lineup. A complete installation could require several different panelboards to be assembled together, each like in FIG. 7, and also other vertical sections specific to a motor control center. Thus, one order for an assembled product may result in many vertical sections like the one of FIG. 7, or different ones.

In the example, stated in generic terms, a typical "vertical section" VS is shown wherein the 2 columns and 10 rows are referred to as (10, 2) in FIGS. 7. It is understood that such two-dimensional representation is peculiar to a panelboard. In contrast, for instance, for a warehouse used to store articles, the generic representation would be three-dimensional, namely with columns, rows and corridors.

Considering again the vertical section VS of FIG. 7, this representation VS ignores what is being contained therein, but merely shows the overall space available. It also provides information regarding the relation of the panelboard with the outside (incoming, outgoing terminals), the operator associated functions (handles, pushbuttons, lights, testing points, ...). This knowledge is acquired in terms of software by pointers shown by lines 2 to 6. By pointer line is meant the relation between the departing location from where a pointer is being addressed to the landing location where it is invoking, while scanning through the two-dimensional geometrical and physical block constituting the vertical section. Such departing location is independent from the afore-stated two columns and ten rows. The true internal organization will only be revealed to the pointer via line 2 once addressing the contents at the landing location, namely the device array DA. Thus, the pointer recognizes via line 2 the rows and columns (10, 2). At 3 exists another pointer line involving the characteristics of the vertical section (but independently from the contents thereof) namely: the bus rating, the bus material, the voltage, etc.. These are listed along a linked-list (3, 3') which at location 13 will derive an Attribute/Value (A/V) pair, then, at 13' another A/V pair. Such successive A/V pairs will indicate characteristics of a more specific nature, or quality (copper or aluminum, three connectors, one handle,). If the invention is applied to an order engineering system other than the afore-stated panelboard (for instance, switchboard and motor control center systems), then, the linked-list 3 may involve A/V pairs such as: transformer type, starter size, etc..

Lines 4 and 4' both point to a data structure which contains information to be used by a rule processor when configuring components, as explained in the patent that we referenced. Lines 5 and 5' both point to an error subroutine which will be invoked whenever error conditions are detected, as explained hereinafter.

Having stated that lines 2 to 5 are pointing to "objects", no information has been given yet relative to the actual "objects" contained in the vertical section 1. This will come from specific listings attached to the several lines 2 to 5. Thus, line 2 is specific to a device array DA. The devices are objects that can be placed within the device array DA, thus, inside the vertical section. Also, a vertical section may be placed like an object within another vertical section, in which case it will be called hereinafter a "subchassis". FIG. 7 shows how are related the individual devices within the device array DA. namely, devices 1 to 4, and how a subchassis SCH occupies the space of a device, the subchassis, typically, including itself another device array DA', the latter with its own individual devices 5 and 6. Each device, each subchassis, that it be in front or in a subposition, has a linked-list addressed to separate and successive A/V pairs at successive locations like those mentioned earlier in relation to lines 3 and 3' for the vertical section VS. The linked-list addresses successive pairs of Attributes and Values, which will be referred to hereinafter as "A/V lists". Thus, in the device array DA referred to by pointer line 2, the first three rows appear to contain, across both the left and the right column, one device (device 1), while a pointer line 8 therefrom recognizes the particular device at 18. From location 18 an A/V list (8', 8'', 8''') reveals successive A/V pairs at 18', 18'' and 18''', respectively, which give the attributes and values relating to such a device (circuit breaker No., frame, voltage, amperes, poles, ...). It is observed that line 2, when pointed to the device array DA, will first learn of the dimensions of the compartment reserved for device 1 (namely, a three rows and two columns space) and, in a cascade fashion, the pointer to device 1 will thereafter reveal what the device itself actually is. Having collected information relative to the recognized device 1, line 2 will now encounter device 2 (block 19) situated in the left column and occupying a single row therein. Thereafter, line 2 will detect with the pointer another device (block 20 for device 3) located in the second, or right column, for the same row. Indeed, A/V lists also exist for each of the devices, although not shown in FIG. 7 for clarity reasons. Then, the scanning process by line 2 will find out that there is a device 4 (block 21) occupying two rows (rows 4 and 5) of the right column. Thereafter, the same rows will reveal themselves to be empty in the second column. It is observed, here, that all devices when pointed at, after the first pointing location therein, possess a code (0:0) for blank at the subsequent pointing location. This "blank" is indicative of a device being detected by the pointer. This is the case for blocks 18, 19, 20 and 21. When line 2 addresses the device array DA further down, a block SCH for a subchassis is recognized by line 12 as occupying the last four rows and transversely the two columns, just like would a prior device, and A/V lists with their contents will be provided at this level. However, in this case, the next query by line 12 will not encounter a code (0:0), thus not blank. This means that the information withdrawn relates to a subchassis, rather than to a mere device. By "subchassis" is meant that the "object" is now occupying a space different from what could be expected from the initial configuration of the vertical section, namely 2 columns and 10 rows. Therefore, not being at a blank (0:0), the pointer will address itself, by pointing line SC, to the new physical and geometrical internal organization involved. As shown by line SC, the pointer from the midpoint in block SCH recognizes six rows and 2 columns for the vertical section VSC occupying the last four rows and two columns of the device DA'. Again, from such "subvertical section", just like for vertical section VS, a pointer will by line 22 find within the subvertical section a device array DA' which, as shown by FIG. 7, possesses two columns and six rows. In the first column there is a device pointed, at 27 (device 5 with a corresponding pointer line 17, and a pointer 17' to an A/V list, not shown) to a device occupying the first three rows, and there is none in the right column for the same rows. In the second column there is a device at 28 (device 6 with a corresponding pointer line 18, and a pointer 18' to an A/V list, not shown) occupying the last three rows, and none in the left column. The subvertical section VSC, like VS, possesses subsequent pointer lines. One is inquiring for an A/V list by line 33 (like line 3 for VS). Lines 4' and 5' point to the same pick data and error function as with lines 4 and 5, respectively, from the VS section earlier-mentioned. Indeed, instead of a blank (0:0) being found within blocks 27, or 28, there could be no blank as an indication of another subchassis. Each subgrouped unit would, then be within the space of the preceding higher rank unit and have its own subdivision and compartmenting.

Referring to FIG. 8, a panelboard representation is illustrated as normally done according to the prior art. The vertical section with its subchassis is represented by a Table giving in its first two columns the respective rows and columns. The depths (assuming the third dimension omitted from the two-dimensional representation of FIG. 7 for reason of simplification) are given in the third column. Then, come columns providing data regarding the bus material, the bus ratings, the voltage. This is followed by a column containing data coded to identify each unique vertical section. The next column indicates which vertical section contains the one specified by the current row. This Table is followed by another Table affected to the devices (devices 1 to 6 in the case of FIG. 7). Now, notation is made whether this belongs to the vertical section VS or to the subchassis SCH. Then, comes the place in the rows and columns, the depth, height and width, the amperes, poles and frame characterizing the device. With such a representation, the engineer has a lot of problems to solve in placing devices, and subchassis, there being no indication relative to the true spatial availability. Many trial-and-error attempts will have to be made in order to find out where and how each device should be disposed, and this will be time consuming.

In contrast, with the configuration of FIG. 7 all the information is collected and stored according to the specification given by the product expert. How this is put together in A/V lists will appear from FIGS. 9, 10A to 10K, from FIG. 11 relative to the vertical section and from FIG. 12 relative to the six devices. FIG. 13 shows the result on the PC computer screen, which is the panelboard appearing as a "product configuration" with all the devices arranged in place as originally prescribed. It appears that the order engineer has now available to him a configuration, abstractly shown may be, but one that can be perceived visually and concretely enough while facing directly the panelboard which is to be filled and functionally installed.

From the preceding considerations, it is seen that an installation may be completed at its very location so as to meet the customer specifications and under an order for a complex product. To that effect, the invention provides a generic set of software tools for representing and manipulating in a computer an image of the intended product. On such substrate can be designed and implemented an engineering order, following the state of actual negotiations, under the offers of an independent distributor, so as to come up with a mechanical, or electrical, system exactly along the line of the complex product which is described by one generic set of software tools such as hereabove-stated. The resulting product configuration system will be of assistance, at the location for the planned installation, both in the manual placement of objects and devices and in the automatic arrangement thereof, within the vertical section illustrated by FIG. 7.

The complex product configuration encompasses, besides the present invention, the subject matters of the two afore-stated cross-referenced patent applications. The purpose is here to make it available, for a particular application, how the assembled product model is representing products in terms of generic devices, vertical sections and attribute/value pairs. The generic tool describes the possible ways to obtain an assembled product model and to manipulate such a model for the particular application. The instructions also lead to the creation and deletion of devices and vertical sections. In other words, it indicates how is governed the placement of a device in a vertical section according to physical and mechanical rules, as well as how the process of automatic arrangement is designed, or redesigned, or modified for a particular application and implementation. Thus, not only the invention deals with a specific installation, but also it provides all the information necessary to alter present arrangements and create a new design, by alteration on the spot. All this is being done with the help of a personal computer for local implementation. As a result, the generic tool can be used to create a product model that can be readily maintained by product specialists, rather than having to call again for computer specialists.

Since the product configuration system according to the present invention is intended to be used with a wide variety of assembled product lines, the information is purposely configured in the computer memory to that effect.

The product model is defined in terms of three central "data structures", namely : 1) the attribute/value (A/V) structure; 2) the device (dev) structure; and 3) the vertical section (VS) structure. By "data structure" is meant an "object" created by the PC computer at CMP (shown in FIG. 9) which is the Product Application used for creating the Product Configuration with the elements, or "objects" so created.

Figure 9:
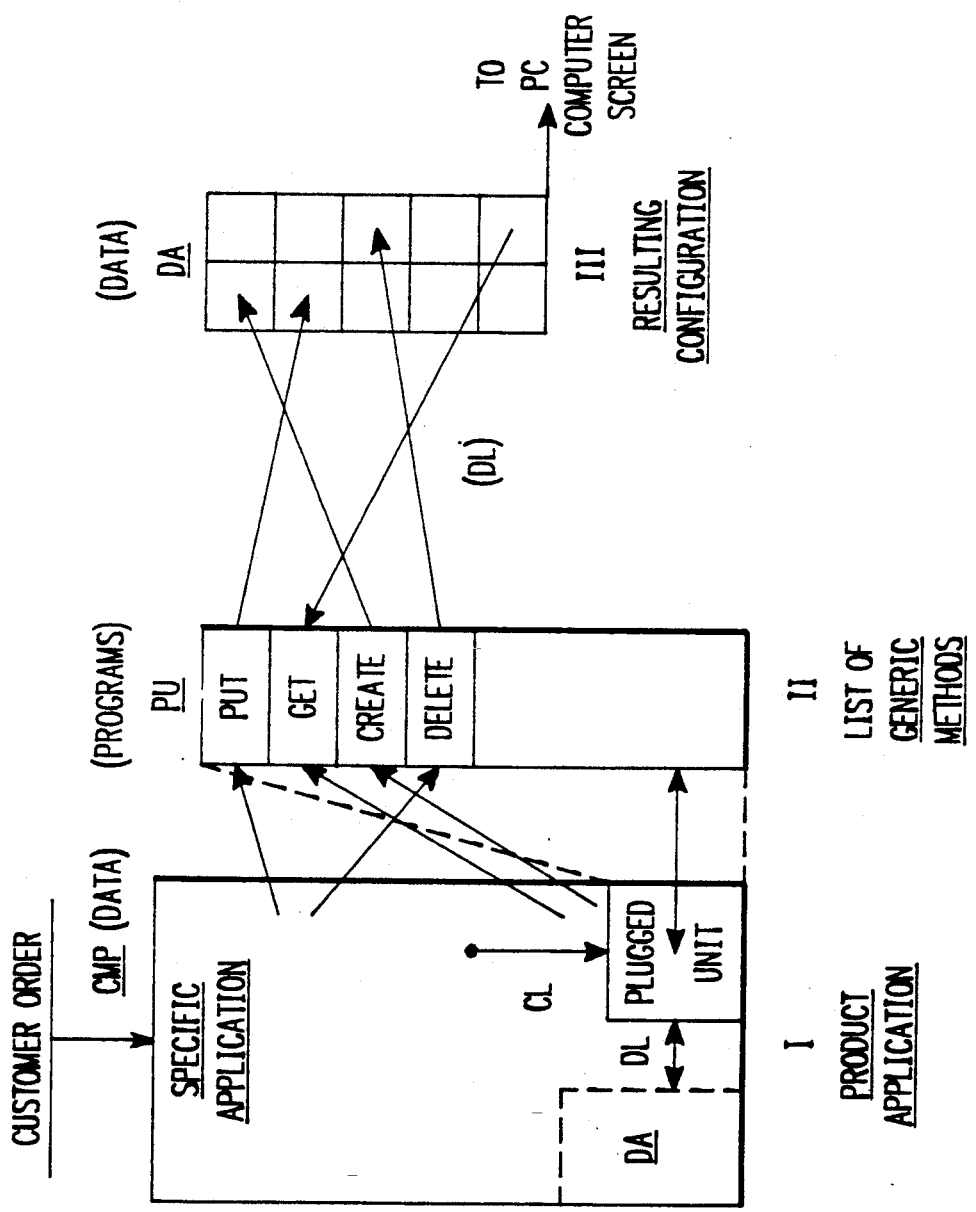
FIG. 9 is a diagram illustrating the process of generating a product configuration in accordance with the invention under a specific customer order.

Referring to FIG. 9, the Product Application (CMP) will dispose of data assembled according to the specification of the customer order. FIG. 11 is an example of such information gathered from the customer's order. With such data, a list is established of which the following TABLE I is an example :

TABLE I

[(corp,WESTINGHOUSE)(ul_type,NONCTL)intr_onl,no)
(spl_box,no)(trim,std)(grd_falt,no)(serv_ent,no)
(lug_type,MEC)(cable_siz,500)(np_type,MASTIC)(gnd_bus,std)
(bus_matl,CU)(neut_rat,200)(bus_amps,800)(rev,1)
(marking,DIST)(quantity,1)(cabl_ent,TOP)(order_type,MI)
(initials,MJB)(mn_dev,MCB)(bus_amps,800)
(wire,4)(phase,3)(volt,480Y/277v)
(aic_rat,25)(date,10/31/89)(pnl_type,PRL4B)
(item_num,001)(go_num,NCMAIN)(columns,2)-(rows,50)
(msh_trip,N)(mpoles,3)(mcon_cur,800)(bamps_lo,20)]

TABLE I is an illustration of Data relative to a Panelboard Vertical Section, the Panel type being PRL4B.

Similarly, FIG. 12 shows Panelboard Device Data, typically used with the Panel type PRL4B and gathered from the customer order. From such data, the Product Application will establish an A/V list, typically for a number of such devices, such as represented by TABLE II, hereinbelow:

TABLE II

[(bbkr_fr,FD)(bspc_prv,N)(bsh_trip,N)(bpoles,3)(bcon_cur,40)(bqty,6)]

[(bbkr_fr,FD)(bspc_prv,N)(bsh_trip,N)(bpoles,2)(-bcon_cur,30)(bqty,4)]
[(bbkr_fr,FD)(bspc_prv,N)(bsh_trip,N)(bpoles,1)(-bcon_cur,20)(bqty,6)]
[(bbkr_fr,KD)(bspc_prv,N)(bsh_trip,N)(bpoles,3)(-bcon_cur,125)(bqty,3)]
[(bbkr_fr,JD)(bspc_prv,N)(bsh_trip,N)(bpoles,3)(-bcon_cur,125)(bqty,2)]
[(bbkr_fr,JD)(bspc_prv,N)(bsh_trip,N)(bpoles,2)(-bcon_cur,100)(bqty,2)]
[(bbkr_fr,MC)(bspc_prv,N)(bsh_trip,N)(bpoles,3)(-bcon_cur,400)(bqty,1)]

Considering now the software implementation of a product configuration, as shown by FIG. 7, the following can be said:

Devices are objects that can be placed inside a vertical section. For example, devices may be breakers, switches, meters, etc. Devices are identified by a characteristic set of attributes. For example, typical attributes that are used to identify branch breakers include breaker frame family, breaker frame, number of poles, and continuous current rating. A convenient notational convention for representing attribute/value (A/V) pairs facilitates the description of a device's A/V list:
(frame_class,F_FRAME)(breaker_frame,EHD)-(poles,3)(amps,100)

In this example an EHD breaker is described as having three poles and a continuous current rating of 100-A. Such an EHD breaker may be considered to belong to the F family of breakers.

With data such as provided in the list of TABLE I, the Product Application of FIG. 9, will use a "Method" selected from a list found in the unit PU plugged into the PC computer. Typically, such a "method" will be to "create a data structure" This will become an "object" which can be "put" at a selected location of the device array DA ,in the chosen illustration of FIG. 9. The "PUT" method will be obtained from the list of "Generic Methods", like the "CREATE" method mentioned earlier. There will be a dialog followed by an exchange of objects leading to all forms of manipulation of "objects" under supervision and control of the Product Application and according to the selected Method. Thus, an "object" will be placed ("PUT" method) in a chosen place within the vertical structure of the device array DA, or withdrawn therefrom ("GET" method), or deleted ("DELETE" method), and data structure created ("CREATE" method) will be given as an attribute to the device so placed within the device array.

1) Such a data structure is the "A/V structure". The A/V structure is defined as follows:

```
struct ATTRIBUTE
{
struct ATTRIBUTE *next;
char *name;
char *value;
};                                                          (1)
```

It appears from (1) that the attribute is represented by an ASCII string pointed to by the "name" structure element. The value is represented by a string pointed to by the "value" structure element. The next element is a pointer to another A/V structure. A chain of A/V pairs can be constructed under the same principle. Both devices and vertical sections may have A/V lists. An example of an A/V list for an EHD, 3-pole breaker, would be on FIG. 7 at 18', at 18" and at 18'''.

2) Another data structure is the "device structure". It is defined as follows:

```
struct DEVICE
{
struct ATTRIBUTE *av_ptr;
struct VERTICAL *sub;
};                                                          (2)
```

It represents any object that can be placed inside a vertical section. It appears from (2) that the av_ptr element is a pointer to an A/V list which uniquely identifies this device. The subelement is a pointer to a vertical section structure. Some products permit a smaller vertical section to be mounted inside a larger vertical section. For example, a PRL4B type is a panelboard which may have a subchassis mounted in it. In this case, the subchassis is considered to be a device, and the subelement points to the vertical section with information about the subchassis. If a device is not a subchassis, this pointer is set to zero (i.e., NULL pointer).

An example of a "device structure" is given by device 1 and the attached string including 18', 18" and 18''' of FIG. 7.

3) The "vertical section structure" is defined as follows:

```
struct VERTICAL
{
int array_rows;
int array_cols;
struct DEVICE **array;
struct ATTRIBUTE *av_ptr;
struct Pick_Data_Struct *pick_data;
int (*error_handler)(char *, int);
}                                                           (3)
```

A vertical section structure represents an object that may contain devices. Example (3) shows an element "array_rows" indicating the total number of device rows possible in a product vertical section. For example, for a PRL1 type of panelboard, this value may be 78 inches. For a PRL4B type, the value could be 50 "×space", and for a typical motor control center, this value could be 12 "×x space". The element "array cols" indicates the total number of device columns possible in a product vertical section. This value is 2 for panelboards and is generally 1 for most other products.

The third element stated in (3) is "array". It is a pointer to an array of pointers to device structures. This device array is used to represent the spatial arrangement of devices in a vertical section. Logically, the device array can be thought of as having as many rows as array_rows and as many columns as array cols.

Another element under (3) is the "av_ptr" element. It is a pointer to an A/V list. For example, the attributes of a panelboard vertical section include : panel type, service voltage, cable entry, etc.

Then, under (3) there is the "pick_data" element. This is a pointer to a structure which is required by the "Rule Processor". The Rule Processor has been fully disclosed in the first above-referenced patent application.

Another element in (3) is the "error_handler" element. This is .a pointer to a series of steps, or a method, which will be called when error conditions are detected (e.g., "out of memory" is a typical error). This technique enables for different applications the use of different error handlers. For example, a fragment of source code invoking a vertical section error handler might be as follows:

```
char *s;
struct VERTICAL *vs;
/*...*/
if (!(s=malloc(10)) && vs && (vs→error_handler))
    (*vs→error_handler)(_FILE_,_LINE_);        (4)
```

The code fragment illustrated under (4) expresses the following concept: if ten bytes of memory cannot be allocated, and if there is a vertical section (vs) the "error_handler" element of which points to something other than memory location zero (i.e., is non-NULL), then the error handler method is invoked with arguments that specify the source "FILE" and "LINE" number of the "ERROR".

It is possible to associate a different error handler with every- vertical section.

An example of a "VS structure" is given in FIG. 7 by VS and lines 3 to 5, with block 7 and lines 8 and 10 for devices 1 and 3.

The three building blocks which have been explained as "data structures" are very general in nature, and can be used to represent a wide variety of assembled products. The representation can be recursive in nature. For example, a panelboard can be represented by a vertical section that points (via its device array DA at 7 in FIG. 7) to a collection of devices (devices 1 to 4 in FIG. 7) mounted in the panel. The subchassis SCH (as shown for rows 6 to 9 on the device array DA) constitutes a valid panelboard device representation. The subchassis "device" SCH points to a vertical section VSC which, in turn (by line 22), points to a collection of devices (including DA' and devices 5 and 6) mounted in the subchassis SCH. Since devices can point to vertical sections, and since vertical sections point to devices, there is no limit to the number of levels in which vertical sections can be mounted inside other vertical sections. In the example of FIG. 7, the product configuration includes four devices (1 to 4) and a subchassis (SCH) mounted in a vertical section. Two more devices (5 and 6) are mounted inside the subchassis. The number of rows available for placing devices inside a subchassis is generally not the same as the number of rows required to represent the subchassis in the parent vertical section. In fact, often even the units in which rows are measured are different. Typically, for a PRL4B panelboard, rows are measured in "x space", while subchassis rows are measured in inches, each "x space" being one and three eighths inches (1⅜ in.) long. The area inside a subchassis available for placing breakers is measured in inches. For example, there may be nine inches available inside a subchassis for mounting breakers, but the subchassis will use up eleven "x spaces" when placed in the parent vertical section.

FIG. 7 illustrates such a product configuration. Pointers which are NULL are represented by 0:0. Pointers which are not NULL are represented by a dot and an arrow to the object to which they point. For clarity, once a type of pointer has been demonstrated, the arrow is omitted, and only the dot is shown to represent a pointer value.

The device arrays are shown as being two dimensional (ten rows by two columns and six rows by two columns). Each pointer in the device array corresponds to one location in the vertical section. For example, Device 2 takes up only one row, and only one column, and is mounted at row three, column zero (i.e., location (3,0)). Therefore, at location (3,0) in the device array there is a pointer to Device 2. Device 1 occupies three rows and two columns. Those six locations in the device array all contain pointers (line 8) to Device 1. At row four, column one, there is no device. In the device array, this particular location contains a NULL pointer.

Applications using this product model need a convenient and efficient technique to determine what device is located at a specific location in a vertical section. The purpose of the device array is to fulfill such a need. For example, if it is required to find out what device is located at row 2, column 1, in the above example, there needs only to check the location (2,1) in the main section's device array. In the process a pointer to Device 1 will be found at that location. If there is no device at a specific location in a vertical section, then, there will be a NULL pointer in the corresponding location of the vertical section device array.

The assembled product model is designed to facilitate operations on a product configuration. Two alternate and most common high level operations consist in inserting a new device in a vertical section or in removing a device from a vertical section. These are methods accomplished according to the generic list of methods of block PU of FIG. 9. These high level operations are founded on two low level operations: 1/ setting (PUT) a device array location to point to a device; and 2/ querying (GET) the device array for a device pointer at a specific location. These two operations are implemented together with the PU unit of FIG. 9, as illustrated by the following code fragment:

```
struct VERTICAL *vs;
struct DEVICE *dev;
int r1, c1, r2, c2;
/*...*/
dev = get_device_pointer(r1, c1, vs);
put_device_pointer(r1, c1, vs) = get_device_pointer(r2,c2,vs)
put_device_pointer(r2, c2, vs) = dev;        (5)
```

This example (5) shows how to use the "GET" and the "PUT" method together to swap two devices in a vertical section. At location (r1, c1) was a device pointer, and at location (r2, c2) was another. The temporary variable (dev) was used to save the device pointer from location (r1, c1) and, correlatively, the device pointer from location (r2, c2) was copied into location (r1, c1). At the last stage, the device pointer indicating a saved device (dev) was copied into location (r2, c2). Thus, it appears that the two methods can be used one as a source, the other as a destination function.

It is also observed that the device array should not be manipulated directly. In practice, the device array is implemented by either the "PUT", or the "GET" method, as a one-dimensional array of pointers, and they are concurring in fact in simulating the two-dimensional array required for a panelboard. This technique can be easily extended from one- to three-dimensional product lines.

Due to the recursive nature of the product model, a subchassis mounted in a panelboard is treated in the same way as a panelboard. The afore-stated double method technique also applies to a subchassis in the same way as it does to parent vertical section. In fact, all operations defined for vertical sections are equally applicable to nested vertical sections. The twin commands used in this double method strictly deal with pointer manipulation, without regard to attributes of the vertical section or of the device. Other high level operations generally perform a query and manipulate the attributes of a device, or a vertical section.

The "PUT" method may be implemented separately by the plugged-unit PU of FIG. 9. Typically, the "PUT" method is: "put_av ( )". This is used to create an A/V structure and to incorporate such structure into an A/V linked-list (such as 8',8" and 8"' in FIG. 7) of structures. For example:

```
struct ATTRIBUTE *avp = NULL;
extern void put_av(structure ATTRIBUTE **,char *, char*);
/* ... */
put_av(&avp, "poles", "3");                                (6)
```

The first parameter in (6) is the address of a pointer to a linked list of A/V structures. If the pointer is set to NULL, then, a new A/V structure will be allocated. The second and third parameters in (6) are the attribute and the value, respectively. Their contents will be copies into the A/V structure. The "avp" pointer will be set to this new structure (in parenthesis) so that the calling function gets access to the new A/V pair.

This method is also used to update existing A/V lists. If the address of a pointer to an A/V list is passed under the first parameter, then, the method will cause a search through the A/V list for an attribute that matches the attribute passed as second parameter. If a match is found, the value stored in that structure is updated by copying the value passed as third parameter. If a match is not found, a new cell is added to the A/V list for this current A/V pair.

New memory is allocated for the attribute and value elements of the A/V structure before the strings are copied.

The "GET" method may also be implemented to find an A/V pair in an A/V list. Thus, comes into play the method "GET" listed in the plugged unit PU of FIG. 9. Typical of such method is "get_av( )". The following is an example thereof:

```
struct ATTRIBUTE *avp = NULL;
char *s;
extern char *get_av(struct ATTRIBUTE *, char*);
/* ... */
if (s=get_av(avp, "poles"))
    printf("Poles = %s  n",s);                             (7)
```

The first parameter under (7) is a pointer to an A/V list. The second parameter is an attribute expressed as a string. This method will cause a search through the A/V list until it finds a matching attribute, and will return the corresponding value. If the pointer to the A/V list is NULL, then, the method will return a NULL. If the attribute passed does not match any attributes in the A/V list, the function returns a NULL.

Also listed in the plugged-in unit PU, is the method "CREATE". This is typically: "create device ( )". It allocates space for a device structure and initializes the device's pointers to NULL. The device structure consists of three pointers. One points to the device's A/V list. This A/V list is used to distinguish one device from another. A second pointer specifies a vertical section. This enables a vertical section to be treated as a device that can be mounted in a parent vertical section. For example:

```
struct DEVICE *dev=NULL;
extern int create_device(struct DEVICE **);
/* ... */
create_device(&dev);
if (dev)
    put_av(&dev→av_ptr, "poles", "3");                     (8)
```

One key parameter of this method is the address of a pointer to a device structure. The method will allocate space for the device, initialize the device's pointers to NULL and, then, will set "dev" in order to point to the device structure. Subsequently, other operations can be performed on the device, such as creating an A/V list. For instance the method: "create_vertical_section ( )". This is used to create a vertical section. Memory for the VS structure is allocated, and all pointers are initialized to NULL. The structure elements array rows and array_cols are set to the values passed in the first and second parameters. The "pick_data" pointer is set to the address of the "rule processor" data structure passed as the last parameter. Memory is also allocated for the device array. The total number of device structure pointers, which constitute the device array, is equal to the product of "array_rows" and "array_cols". The vertical section A/V list is created by making a copy of the A/V list passed as the third parameter. The fourth parameter is the address of a pointer to a vertical section, and this pointer is set to the address of the new vertical section. For example:

```
struct ATTRIBUTE *avp = NULL;
struct VERTICAL *vs = NULL;
struct Pick_Data_Struct *pdata = NULL;
extern void create_vertical_section(
    int, int, struct ATTRIBUTE *, struct VERTICAL **,
    struct Pick_Data_Struct *);
/* ... */
create_vertical_section(78, 2, avp, &vs, pdata);
if (vs)
    put_av(&vs→av_ptr, "pnl_type", "PRL1");                (9)
```

It tells that a vertical section is created that is 78 by 2 units in size. The structure "pick_data" element is to set pdata. The A/V list pointed to by "avp" is copied to a new linked list, and the structure "av_ptr" element is set to point to this new list. The "vs" pointer is set to the new vertical section.

Whether, or not, a device can be mounted in a vertical section depends upon three generic criteria :

1) Electrical Validation, which is a determination of whether or ont a specific device may be placed in a specific vertical section given the electrical characteristics of the device and the vertical section. A panelboard is characterized, for example, by its service voltage, interrupting rating, and main rating. These characteristics, which are represented as A/V pairs, limit the selection of branch circuit breakers that can be mounted in a given panelboard. Circuit breakers can be characterized, for example, by breaker frame and continuous current rating. Characteristics of circuit breakers can be cross referenced with characteristics of panelboards to determine which breakers are electrically valid for which panelboards.

2) Physical Validation, which is a determination of whether or not there is sufficient space available at a specific location in a vertical section for a specific device. The relevant device A/V pairs are the number of rows and the number of columns a device consumes in a vertical section (i.e., the device height and width), and the total number of rows and columns available in the vertical section (i.e., the vertical section height and width). If the device can fit within the vertical section at the specified location, then the vertical section's device array must be inspected to determine if there is a conflict with a device already located in the panel. For example, if the main lugs require ten rows and two columns in a panelboard, then no other device may be mounted in such a way as to overlap any of these fourteen locations.

3) Mechanical Validation, which is a determination of whether or not a device can be mounted in a vertical section, given constraints imposed by other devices already placed in the vertical section. For example, to mount an EHD breaker in a typical panelboard, a number of requirements must be satisfied. These conditions may be that : the frame class must be compatible with the vertical section type, the frame class must be compatible with the frame classes of breakers mounted in the opposite column (i.e., cross mounted), and the continuous current ratings must be consistent.

Physical validation and mechanical validation differ from electrical validation. A device can be determined to be electrically valid for a given vertical section independent of other devices. Physical and mechanical validation can only be determined in the context of other devices already placed in a vertical section. This means that electrical validation can be effected a priori, before the product order has been configured, and this is assumed to be the case in the methods described herein.

There is a method: "place_device ( )". It is used to place a device in a vertical section. The device is assumed to be electrically valid. If the device is physically and mechanically valid, it is placed in the vertical section, and the function returns TRUE. Otherwise, the function returns FALSE. For example,

```
struct VERTICAL *vs = NULL;
struct DEVICE *dev = NULL;
int row, column;
extern int place_device(struct VERTICAL *, int, int,
struct DEVICE *);
/* ... */
if (place_device(vs, row, column, dev))
printf("Placed device at (%d,%d). n", row, column);
else
printf("Couldn't place device at (%d,%d). n",
row, column);                                    (10)
```

The first parameter is a pointer to a VS structure. The last parameter is a pointer to a device structure. The second and third parameters are the row and the column coordinates of the location in the vertical section where the top left corner of the device is to be located.

The process of placing a device in a vertical section consists in setting some device A/V pairs with the appropriate pointers in the vertical section device array to point to the device. The device A/V identifies the vertical section, or subchassis, in which the device is to be mounted, and the row and column in the vertical section where the top left corner of the device is to be located. Subsequently, the get_device_pointer method can be used to retrieve a pointer to the device in the vertical section.

As shown in the PU block of FIG. 9, there is also the method "DELETE". Typical of it is the method : "delete_device ( )". This is used to delete a device at a specified location in a vertical section. In addition to resetting the pointers in the vertical section's device array to NULL for the area previously occupied by the device, all memory associated with the device is freed. This includes freeing the A/V list of the device and all memory associated with an attached subchassis, if there is one. For example:

```
struct VERTICAL *vs = NULL;
int row, column, height, width;
extern int delete_device(struct VERTICAL *, int*, int *,
int*, int*);
/* ... */
if (delete_device (vs, &row, &column, &height, &width))
printf("Device removed from (%d,%d). Height was %d,
width was %d. n", row, column, height, width);
else
printf("Couldn't delete device. n");            (11)
```

In this example, "vs" is a pointer to a vertical section. "row" and "column" are the addresses of variables that specify the location of a device to be deleted. If the device is successfully deleted, then, the last four pointer parameters are set to the top left corner and the height and width of the device that is deleted.

The method: "delete_vertical section ( )" is used to free all memory associated with a vertical section. For example:

```
struct VERTICAL *vs = NULL;
extern void delete_vertical_section(struct
VERTICAL **);
/* ... */
delete_vertical_section(vs);                    (12)
```

The parameter is the address of a pointer to a vertical section. After the vertical section is freed, this pointer is set to NULL. In addition to deallocating memory for the vertical section structure, memory allocation for any devices referenced by the device array is also freed. The vertical section A/V list is also freed. The other vertical section elements (which include a pointer to an error handling function and a pointer to a rule processor structure) are not freed.

FIGS. 10A to 10K are flow charts illustrating the operations involved with the methods listed in the plugged-unit PU of FIG. 9, as applied with the PC computer in order to build-up the product configuration PCF input of FIG. 1.

Figure 10A:
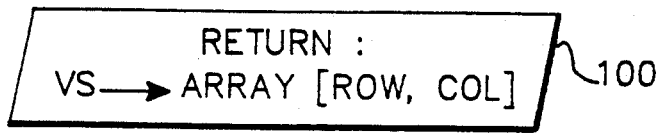
FIGS. 10A to 10k are flow charts illustrating several individual methods used by the configuring computer for implementing the building steps between a specific application derived from the customer order and the final product configuration.

When getting a device from the vertical section, as shown at 100 in FIG. 10A, the operation is identified as: dev=get_device_pointer (VS,row,col)

Figure 10B:
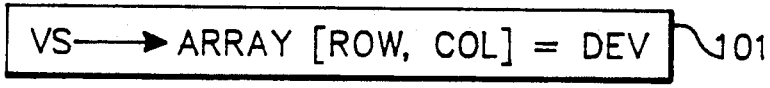

It means that, as an instruction for a device (dev) to be gotten, a "get device pointer" is addressed to the vertical section (vs), its row and column (row,col). As shown in FIG. 7, line 2 points to device array DA, looking at the specified row and col, then, the pointer found at that location is returned to the dev. This is expressed by block 100 of FIG. 10A, correlating an operation arrow from DA to PU in FIG. 9. FIG. 10B relates to the opposite operation, which is putting an identified device at the chosen place. Block 101 shows how to put the device pointer dev into the device array DA for a specified vs, at the specified row and col .

Figure 10C:
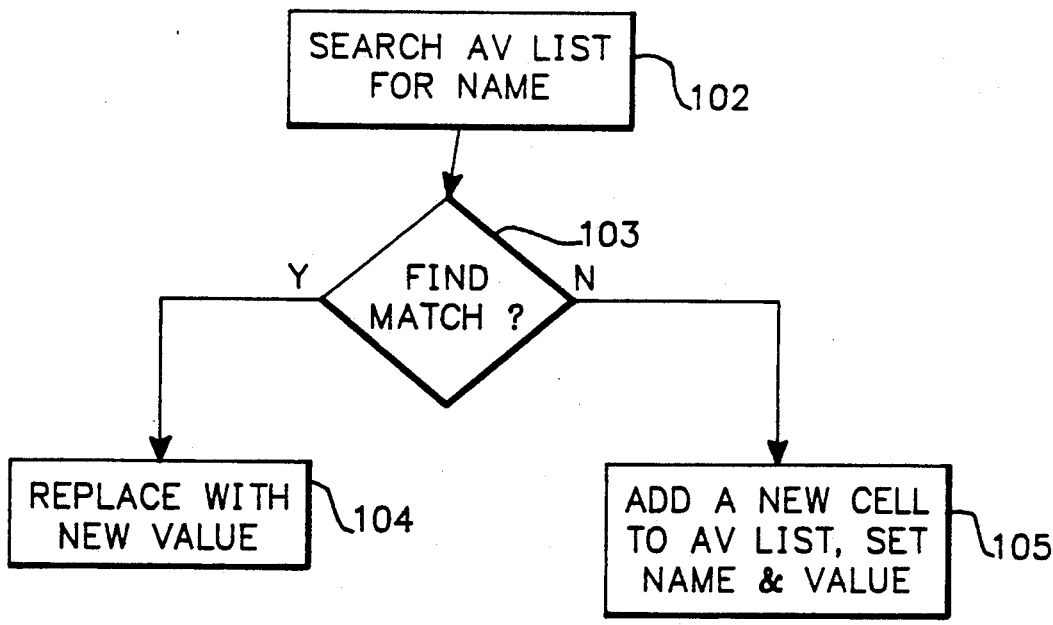

FIG. 10C is a flow chart relative to the attribute values with the name, for instance: amperes/100, or volts/240, or poles/3. The operation is expressed as follows: put_av (av,name,value). At 102 a search is effected among the av list for a name (for instance: poles), then, at 103 the question is raised whether a match has been found. If YES, the system goes to 104 where the command is to give it a new value (if it were "3", for 3 poles, it will become, for instance, "2" for 2 poles. If NOT at 107, this means that there was no existing name and value for the attribute ("poles"), may be there was only on the list "amperes" and "volts". Then, the system goes to 105 where a new storage cell for "poles" is added to the av list, while setting name and value ("poles" and "2").

Figure 10D:
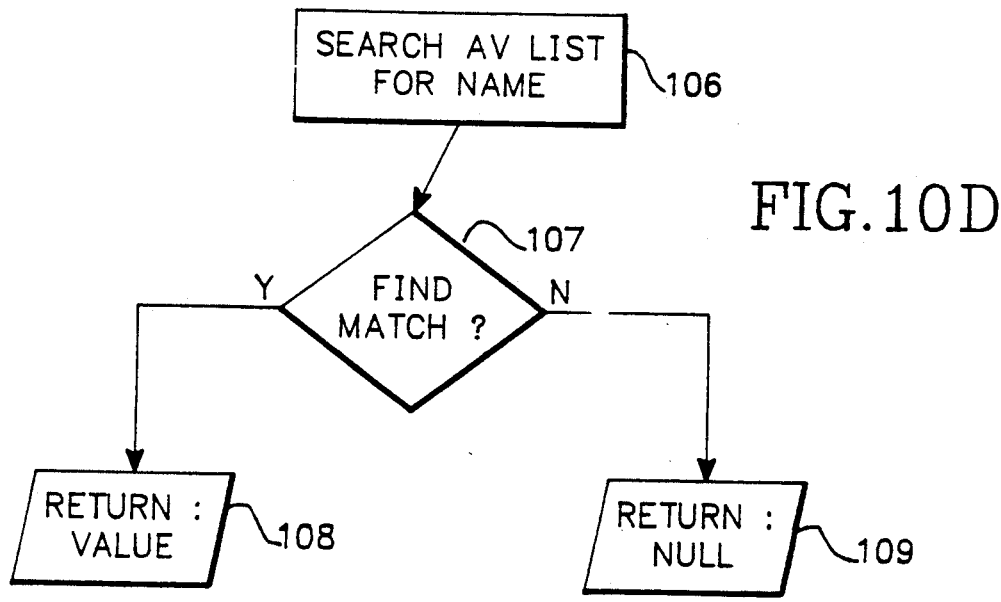

FIG. 10D deals with the opposite of the operation set forth under FIG. 10C. Here the name (for instance: "pole") and/or the value ("3" or "2" for the poles) of what is found at the scanned location is to be recognized. The operation is expressed: value=get_av (av,-name). At 106, there is a search made through the av list to find a name. Thereafter, at 107 the question is raised: whether there is a match? If YES, at 108 a Return of the value found is conducted. If NO at 107, the Return is NULL at 109.

Figure 10E:
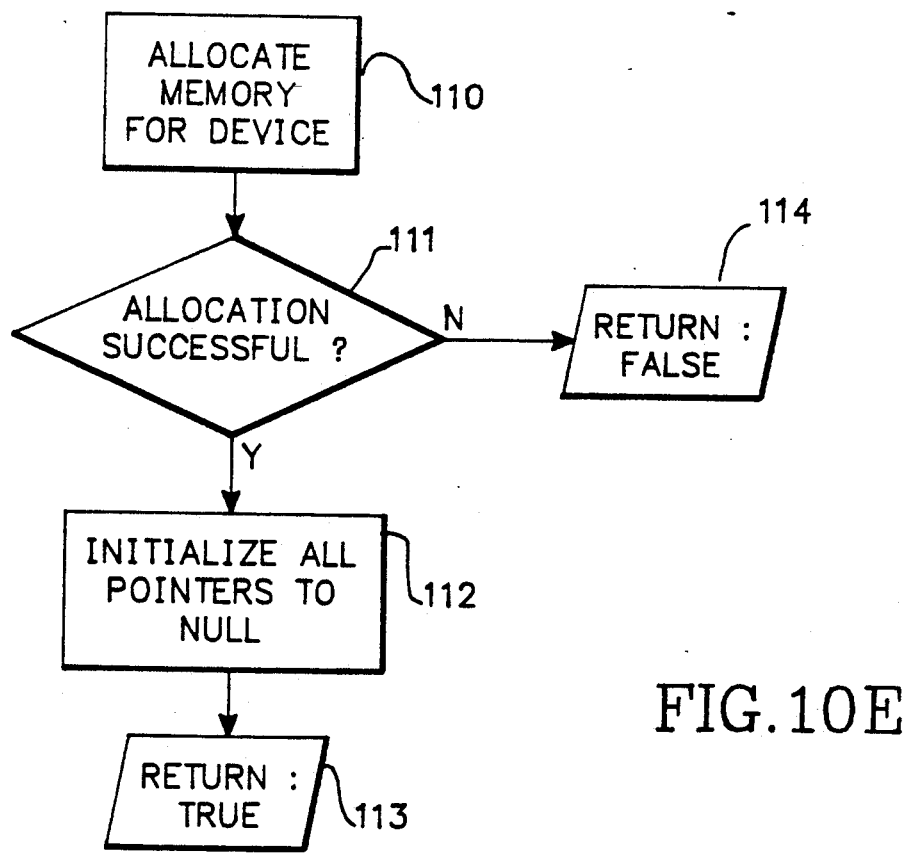

FIG. 10E goes to the CREATE method applied to a device (create_device). At 110, memory is allocated for the device. At 111, the question is raised whether such allocation has been successful. If YES, at 112 all the pointers are initialized to NULL. If NO at 111, the system goes to 114, which means RETURN: False. From 112 there is at 113 a RETURN: True.

Figure 10F:
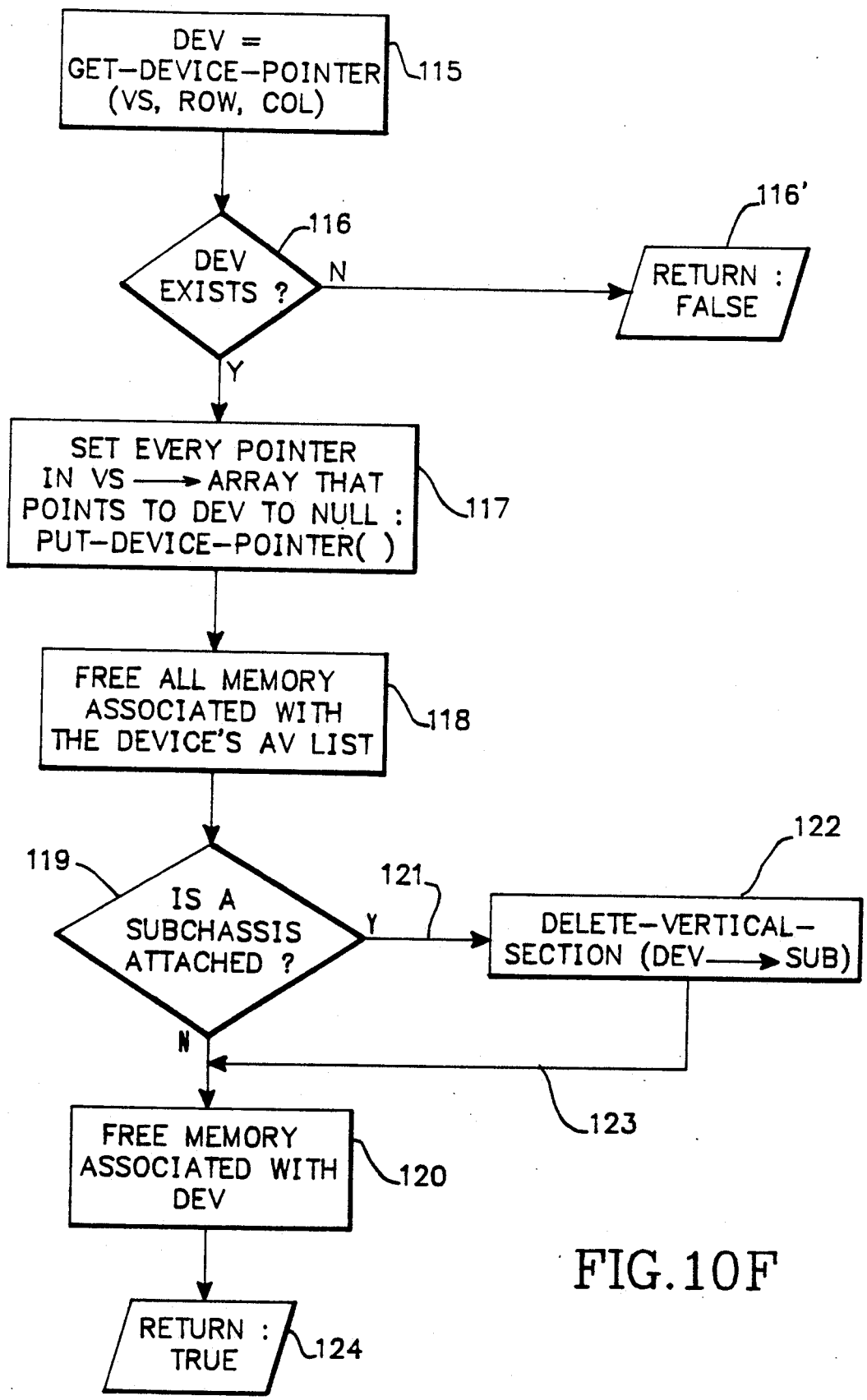

FIG. 10F is a DELETE device method. The equation is delete_device (vs,row,col). At 115, is established dev=get_device_pointer (vs,row,col), thus, establishing a connection in the vertical section with the row and column where the pointer is being addressed. At 116 is determined whether a device there exists. If NO, at 116' the RETURN is False. If YES at 116, at 117 every pointer is set to NULL which in the vertical section addresses in the array (DA of FIG. 7) a device. The applied method is: put_device_pointer. Thereafter, at 118, all memory associated with the device av list is freed. Then, comes at 119 the question: is there a subchassis? If NOT, at 120 the memory is made free of the device, and at 124 a RETURN to True will take place. If YES at 119, at 122 will be performed: delete_vertical_section (dev.sub) followed by a Return via 123 to 120.

Figure 10G:
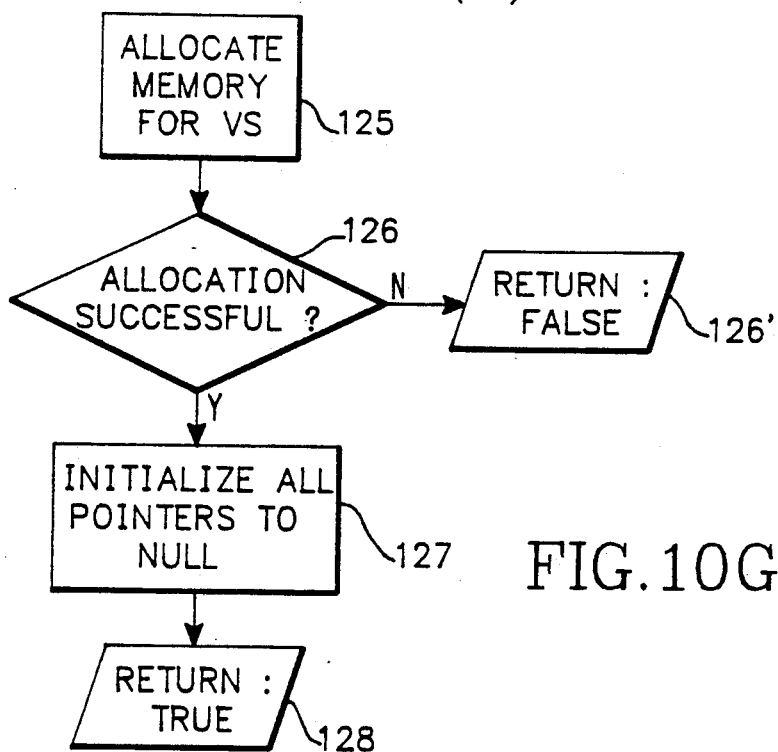

FIG. 10G implements the equation: createvertical section (vs). In order to CREATE a vertical section, at 125, memory is allocated for the vertical section. Then, at 126, the test is made whether the allocation has been successful. If YES, at 127 all pointers are initialized to NULL and at 128 there is a RETURN True. If NO at 126, the RETURN is False at 126'.

Figure 10H:
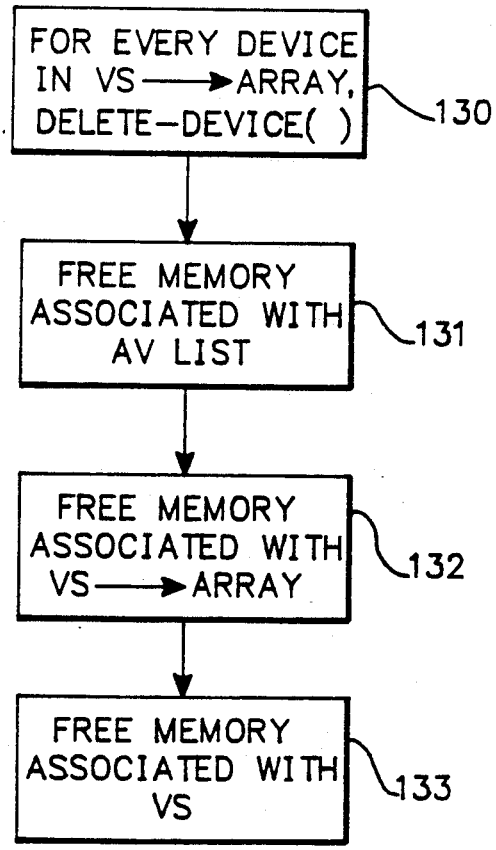

The flow chart of FIG. 10H expresses: delete_vertical_section (vs). At 130, for every device in the vertical section (for instance, the array DA) takes place a "delete_device ( )" operation. Then, at 131 the memory associated with the av list is freed, while at 132 the memory associated with the vertical section, or array, is freed. Finally, at 133, the memory associated with the vertical section is freed.

Figure 10I:
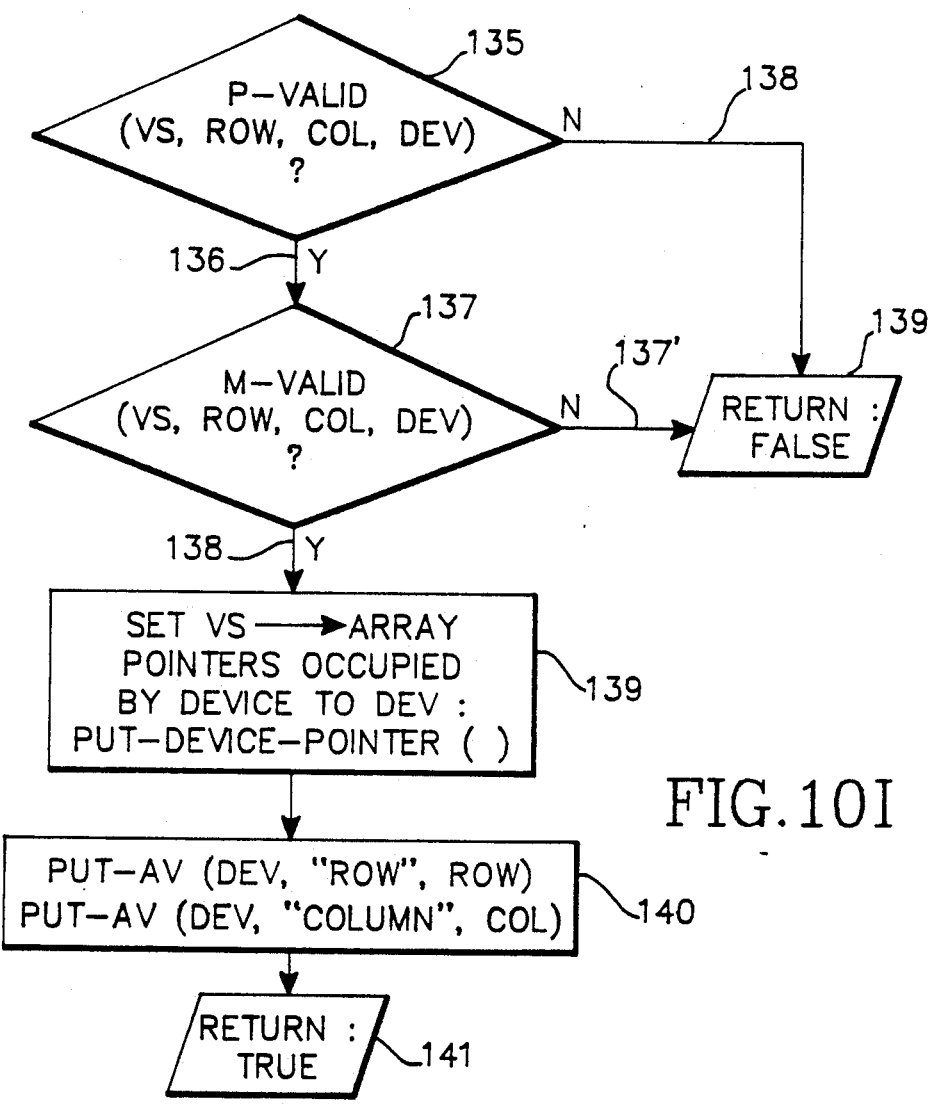

The flow chart of FIG. 10I performs placing a device according to the formula: "place_device (vs,row, col,-dev)". The initial question is at 135: whether this is "physically valid", namely, whether the device fits within the available space. The answer is given by the processing steps shown by the flow chart of FIG. 10J. If NO, by 138 the system goes to 139 where there is a RETURN False. If YES at 135, by 136 the system goes to another initial test at 137 where the question is: whether this is "mechanically valid"? The answer depends upon the process of the flow chart of FIG. 10K. If NO at 137, by 137' there is again a RETURN False at 139. If YES at 137, the system goes to 139. At 139, the "vs array pointers" occupied by the device to be placed are set with the PUT method: "dev=put_device pointer (row,col)". Thereafter, at 140, a PUT method is applied for the attribute values for the device by rows "put_av(dev.av, "row", row)" and by columns "put_av(dev.av, "col", col)". Then, there will be a RETURN True, at 141.

Figure 10K:
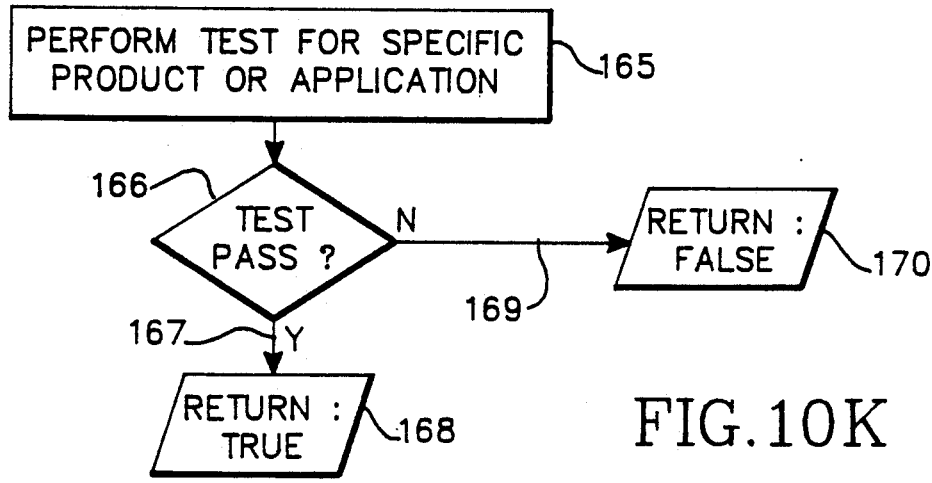
Figure 10J:
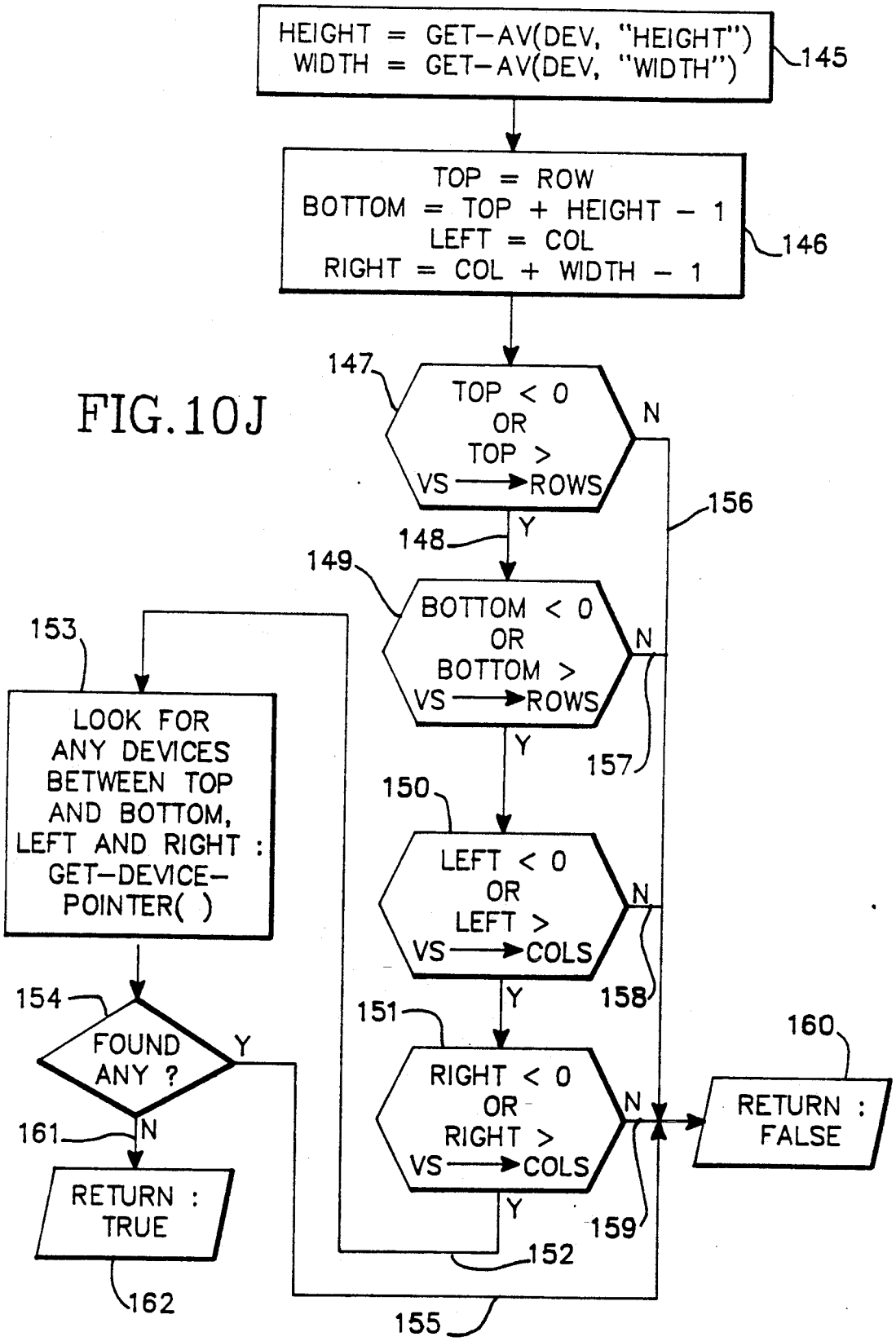

The "physical validity" test of step 135 of the flow chart of FIG. 10I is developed by the flow chart of FIG. 10J, whereas the mechanical validity test of step 137 appears with the flow chart of FIG. 10K.

At 145, in the flow chart of FIG. 10J, the height and the width, of the device to be placed (FIG. 10I) and which is to be matched with the available space at the sought for location, are called for with the GET method according to the respective equations: "height = get av (dev.av, "height")" and "width=get_av (dev.av, "width")", respectively. Then, at 146, the top of the device is stated as a "row" belonging to the vertical section. For instance, regarding the device array DA of FIG. 7, Device occupies three rows, namely rows 0, 1, and 2. The top row would be of rank "zero". The heights, as earlier stated, are counted in units, each unit being equal to one row. Counting the height toward the bottom would amount to 3 in the example. However, in order, not to account for the initial 0 in counting, there will be a −1 added to it. Accordingly, the relation "bottom=top+height −1" expresses what the device (or array) occupies vertically in the vertical section. The same is done horizontally with the width of the device. FIG. 7 shows two columns, one to the right, one to the left. Again, to the left the column is counted as 0, and 1 to the right, the units being "x space" as defined for the particular application of a panelboard. Placing the left of the device in one column, as "col" (meaning 0 for the left, and 1 for the right to the left) as expressed by "left=col", the width is accounted for towards the right side by the relation "right=col+-width −1". Here too, a −1 is placed accounting for the initial 0 in the count of columns. Successive tests will take place at 147, 149, 150 and 151, which, if all positive, lead to step 153. At 147 the test is : whether the top of the device (device 1 in the example) exceeds the top row. This is translated by "top<0". Another test at 147 is whether the top of the device is below the bottom of the space available (below row 4 in the example of device 1 in FIG. 7). This is translated by "top >vs.rows" (meaning larger than the height of the DA, 10 in the example). The same is done for the bottom of the device. At 149 the first test is : whether "bottom<0", meaning whether the bottom is above the highest row. The second test is: whether the bottom is lower than the lowest row. This is expressed by: "bottom >vs.rows" (meaning larger than the vertical distance of the device array DA in the example). Another verification is effected at 150 for the left side of the device, at 151 for the right side of the device. Here again, "left<0" is the test whether the left side of the device exceeds the space to the left (the left wall of the left column in the example), whereas, "left>vs.col" tells whether the left side of the device is beyond the limit to the right of the device array DA (the right wall of the right column in the example). Similarly, at 151 the tests are made for the right side of the device (with respect to the left wall of the left column, and with respect to the right wall of the right column). These tests are expressed by "right<0" and "right>vs.col", respectively. If all the tests of steps 147, 148, 149, 150 and 151 are satisfied, the device (device 1 in the example) fits the allowable space.

Now, the question remains whether there is any device already in the space. To this effect, the system by 152 goes to 153 for the test. Between top and bottom, between left and right, the search will be conducted and the GET method used to recognize such a device, if any. The "get_device_pointer ()" is addressed accordingly. If there is one found, the whole process will have been unsuccessful, and the system via 155 goes to 160 where there is a RETURN False. Otherwise, by 161 there will be at 162 a RETURN True.

FIG. 10K is a flow chart specifying at 165 the tests to be performed to see whether the specific product or the particular application thereof is valid. Example of such tests, as previously mentioned, would include making sure the frame class of this device is compatible with the devices mounted in the opposite column, and making sure that the ampere ratings of the sum of this device and any device mounted opposite do not exceed the prescribed limits, etc.. At 166 it is determined if all the tests have been successful. If YES by 167 the system goes to 168 where there is a RETURN True. If NO at 166, by line 169 will come at 170 a RETURN False.

Referring to FIG. 1, it appears that the Product Application on the PC computer has generated a Product Configuration. All the problems involved with the approach of FIG. 8 will have been solved, and the final stage of assembling the panelboard will have become straightforward.

Many products are too complex to be ordered as commodities. These products must be custom assembled to meet customer specifications. Methods, referred to as the complex product configuration system, are now proposed for representing and manipulating an assembled product.

These methods, when implemented in a computer, form the basis of applications ranging across order engineering, negotiation, independent distributor, and electrical consultant systems for complex product lines. Configuration systems that engineer order for complex products are the key element in managing white collar costs and improving productivity. Distributor and consultant systems are an important way to improve linkage with customers. The invention leads to knowledge-based system technology, most useful both as a key market differentiator and as a means to keep white collar costs down.

Although the methods herein disclosed apply to any computer language, or operating system, their implementation to personal computers proved to be successful, especially in field sales system for panelboard negotiations. The invention has also been proved successful as an order engineering system for a subset of the DS switchgear product line.

"Product configuration" is the foundation upon which computer systems that support order engineering, negotiation, and other applications of complex products can be constructed. To implement a product configuration process in a computer requires methods for representing how devices are arranged in a complex product, how to manipulate these devices (i.e., how to move them around inside the product), how to determine the constraints imposed by the physical size of individual devices, and how to determine the electrical, mechanical, or other constraints on device placement in a product.

Computer systems designed to address this problem have traditionally been ad hoc solutions. In these solutions, methods for product representation and manipulation are interwoven in special purpose software that cannot be reused for other product lines or other applications. In other words, the methods are "hard-coded". The design of these systems has serious ramifications not only on reusability, but on routine maintenance. Because the implementation of the methods is highly interdependent, small changes in one part of a system can have unforeseen effects on other seemingly unrelated parts of the system. In addition, such a design makes it very difficult for new personnel to become involved in the development or maintenance of these systems. To be effective, these personnel must be highly skilled and then highly trained in the subtleties of the specific system. These factors contribute significantly to the problem of high software development and maintenance costs.

What is needed is a method of product representation that is independent of specific products and independent of the methods used to manipulate devices in this representation. Methods to manipulate devices inside a product housing are then needed that are independent of the rules that determine whether a configuration is electrically, mechanically, or otherwise valid. A method of representing and applying configuration rules is needed that can be developed and maintained by product specialists, not by computer scientists.

The product configuration system according to the invention is designed to address a wide range of requirements from a spectrum of complex product lines. The methods involved, while designed to be independent of specific product lines and hardware platforms, are targeted at personal computers. The system allows a straightforward maintenance, requires a minimum of computer memory, and a small amount of disk space.

The method of product representation, called the "assembled product model", introduces three central objects: the "vertical section", the "device", and the "characteristic". A vertical section is a generic term for a product structure such as a panelboard, a switchboard main section, a switchboard distribution section, a motor control center structure, and so on. A device is a generic term for a component (or group of components) which can be mounted in a vertical section, e.g., a circuit breaker, a motor starter, etc. A characteristic is an attribute/value (or A/V) pair which defines a specific characteristic of a vertical section or device. The former example of a circuit breaker may include the following characteristics: FRAME/CA, POLES/3, AMPS/150, etc.

Each characteristic is represented by a structure consisting of three elements. The first element is a "pointer" to the next characteristic. Any one of a list of characteristics can be found by traversing the list given a pointer to the first characteristic in the list. The pointer element in the last A/V pair does not point to anything. This is indicated by the use of the special value "NULL". A device is represented by a structure consisting of two elements.

1) The first element is a pointer to an A/V list. This list can be defined to suit the product line and application. There is no limit to the length of the A/V list, nor are there constraints regarding the definitions of the characteristics. The other element is a pointer to a vertical section.

A vertical section is represented by a structure consisting of three elements. One is a pointer to an A/V list. This list corresponds to the device A/V list, but it defines the characteristics of the vertical section. The second element is a pointer to a device array. The device array is a structure with R rows and C columns, where R and C depend upon the product and application. For example, a panelboard may be R=50 and C=2, and a switchgear system R=4 and C=1.

Each element in the device array is a pointer to a device structure. As shown in FIG. 6, several elements of the array DA may point to the same device (18). If only one pointer points to a device, then that device only occupies one row and one column of the vertical section. If six pointers (three rows by two columns) point to the same device, then that device occupies three rows and two columns in the vertical section. If an array element is NULL, then that space in the vertical section is empty. Finding the device at any location in the vertical section is as simple as referencing the pointer in the corresponding location in the vertical section's device array.

The third element in the vertical section is a pointer to a structure that is used to implement an interface to a rule processor, preferably one as disclosed in the first incorporated by reference patent application.

2) The second element of the device structure, as noted previously, is a pointer to a vertical section structure. This mechanism enables vertical sections to be embedded inside other vertical sections to an arbitrary depth. As shown in FIG. 6, a vertical section (or subchassis) is mounted inside another vertical section. The subchassis is represented by a device in the parent vertical section which is pointed to by elements of the device array. The vertical section pointer of the device structure, in turn, points to another vertical section. This subchassis has its own device array which references devices mounted in the subchassis.

This model of a complex, assembled product is designed to facilitate operations on a product configuration and to represent any complex product line. A number of methods are defined for manipulating the assembled product model. The convention that will be used to describe each of these methods is to give a name followed by a list of parameters relevant to the method. For example, example_method(p1, p2, p3).

The device array may be queried by the get_device_pointer(vs. row. col) method. The first parameter vs. is a pointer to a vertical section structure. The second and third arguments are a row and column in the vertical section's device array. The method will simply return the value of the pointer at such specified location in the device array.

A complementary method is: put_device_pointer (vs. row. col. dev). It places a pointer to a device structure (the fourth parameter) in the device array and at the specified location.

A/V lists are created using the method: put_av (av. name. value). Here, the first parameter is a pointer to an A/V list. The second and third parameters are an attribute and a corresponding value, respectively. This method creates an A/V structure and adds it to the A/V list.

A complementary method is: get av (av. name). It searches through the specified A/V list for an attribute which matches the specified name. The method returns the corresponding value if a match occurs, and NULL otherwise.

Methods are also required to create and delete devices and vertical sections. Considering method: create_device (dev. av. vs). It creates a device structure and sets the first element to point to the specified A/V list, the second element to point to the specified vertical section (or NULL if the device is not a subchassis). Another method is: delete_device (dev), deletes the A/V list and the vertical section that the device points to before deleting the device structure itself.

The "create_vertical_section(vs. av. rp)" method creates a vertical section structure and sets the first element to point to the specified A/V list and the third element to point to the specified rule processor structure. This method also must create a device array whose size depends upon the product and application. The height and width of the device array may be specified by characteristics in the vertical section's A/V list. The second element of the vertical section structure is set to point to this device array. The "delete_vertical_section(vs)" method is used to delete all devices in the device array, the A/V list, the device array itself, and then the vertical section structure itself. It does not delete the rule processor structure since that may be used elsewhere in the system.

The "place_device(vs. row. col. dev)," method is used to place a device in a vertical section. It returns an indication of whether it was successful or not. Success or failure depends upon methods for physically validating and mechanically validating the device placement.

The "p_valid(vs. row. col. dev)" method determines whether there is enough physical space available at the location in the vertical section to place the device. This depends upon the height and width of the device. These characteristics may be conveniently represented in the device's A/V list. If there are no devices already placed at the specified row and column of the vertical section's device array in the region defined by the height and width of the device, then physical validation is successful. This method is product and application independent.

The "m_valid(vs. row. col. dev)" method determines whether a device is mechanically valid when placed in a vertical section at a specified row and column, given the devices that have already been placed so far. This method is dependent upon a specific product and application. For example, for panelboards, mechanical validation depends upon such criteria as breaker frame compatibility, connector cross mounting restrictions, and the location of branch shunt trips. In one implementation of this method, these criteria are represented in a tabular rule base instead of "hard-coded" in software. This means that mechanical validation rules can be easily changed by product specialists without modifying any software.

If the physical and mechanical validation methods are successful, then device placement succeeds. A complementary method is required to remove a device from a vertical section.

The assembled product model and the associated methods to manipulate it, when taken together, form the complex product configuration system.

Because these methods work independently from the definition of specific vertical section and device characteristics, this system is easily adapted to a wide range of product lines. These methods require no additional programming for new products or new applications. All necessary changes to rules or characteristics can be made by product specialists. This independence also means that product line design changes are easy to implement. If new devices are designed, or if old ones are modified, the product specialist has only to update vertical section and device characteristics without having to modify the methods.

The configuration system also works to prevent errors from happening proactively through the validation mechanisms. In other words, instead of allowing the user to try combinations which may turn out to be invalid, and then checking for illegal configurations after the fact, this system prevents errors from happening by applying the necessary intelligence as each device is placed. Thus, manual product configuration editors can prevent users from making mistakes, which eliminates an important source of user frustration. This technique also vastly simplifies the process of automatic arrangement since only valid configurations are possible at any given step. The automatic arrangement process does not have to detect illegal configurations and then backup and try a new solution path.

The product configuration system is designed to run on inexpensive hardware platforms. The first implementation runs very efficiently on any IBM personal computer or compatible under the DOS operating system. Machines based upon the 286 or 386 processor enhance performance, but are not necessary. The system is designed to work with operating systems which include DOS, OS/2, or Unix.

Novel methods have been presented for representing and manipulating complex products which are machine-independent, product-independent, and application-independent. In other words, these methods can be implemented on any hardware platform, applied to products ranging across panelboards, motor control centers, and DS switchgear, and can be used to implement applications which include order engineering, negotiation, and electrical consulting.

These methods, when used, not only increase white collar productivity, but also provide a foundation for establishing systems which may be deployed externally to improve the linkage with customers.

I claim:

1. A generic tool for PC computer-aided assembly of a complex product involving actual subsections forming an actual vertical section in up to three dimensions and a plurality of actual units pertaining to said vertical section, comprising :
    a PC computer including :
        first means for storing, for each of said units, data representative of a structure thereof and for storing, for each of said subsections, structure representative data concurring in providing a representation of the vertical section structure;
        second means for generating, with said first means stored structure representative data, a product configuration establishing an interrelationship between said vertical section and said units; and
        means interposed between said first and second means for transferring selected ones of said stored structure data from one to the other of said first and second means; and
        means being provided by said transferring means for testing the physical compatibility between selected unit data structure and selected subsection data structure before allowing said product configuration to be established therewith;
    said second means providing on the screen of the PC computer a visual representation of said product configuration;
    whereby said complex product is assembled in situ with the assistance of the PC computer visual product configuration.

2. The generic tool of claim 1 with said transferring means selecting unit data structure in relation to a corresponding selected subsection data structure of said second means, and said testing means intervening to allow storing said selected unit data structure with said selected subsection within said product configuration.

3. The generic tool of claim 2 with said selected unit data being derived from one of said first means and of said second means.

4. The generic tool of claim 2 with unit structure representative stored data being cancelled from said first means and corresponding stored data being cancelled from said second means.

5. The generic tool of claim 2 unit structure representative stored data being replaced in said first means and corresponding stored data being replaced in said second means.

6. The generic tool of claim 2 with at least one of said subsections including a subvertical section comprised of a plurality of subsections; unit structure representative data being associated by said transferring means to at least a corresponding one of said corresponding subvertical section subsection and being stored in said second means.

7. The generic tool of claim 6 with said vertical section being representative of rows and columns of a panelboard defining cases allocated to place devices therein; said subvertical section being a subchassis as part of said vertical section; said units being devices having individual attribute values corresponding to said stored unit representative data structures, and said subsections having individual attribute values corresponding to said stored subsection representative data structures, said devices being to be placed by said transferring means within a corresponding subsection of said product configuration in accordance with said physical compatibility test.

8. The generic tool of claim 7 with said transferring means effectuating a mechanical compatibility test before transfer of data structure into said second means.

9. A generic tool for PC computer-aided assembly for an installation involving actual cases forming an actual vertical section of up to three dimensions and a plurality of actual objects to be placed and installed therein, comprising :
    a PC computer including :
    means for defining in up to three dimensions a plurality of virtual cases disposed side-by-side and on top of one another to form a virtual vertical section;
    means associated with said virtual vertical section for pointing out to functional relationships in relation to said virtual cases;

means associated with said virtual vertical section for pointing out to structural relationships between said virtual cases;

means associated with said virtual vertical section for pointing out to structural relationships between said virtual cases and outside said virtual vertical section;

means for defining respective virtual objects, each of said virtual objects being pointed out to at least a corresponding one of said virtual cases;

said virtual object defining means associating with each of said virtual objects a cascade of specific information defining means relative to the associated virtual object functionally, structurally and nominally;

said virtual object defining means providing for each virtual object a definition of physical compatibility conditions relative to an associated virtual; and said virtual vertical section defining means and said virtual objects defining means concurring in providing a product configuration representation characterizing the association of said virtual objects and said virtual vertical section;

the PC computer being responsive to said product configuration representation for presenting a visual representation thereof;

whereby the PC computer provides a generic tool, with ad hoc specific visual instructions matching data inputted into the PC computer, for defining a virtual vertical section and virtual objects regarding the installation in an actual vertical section of actual objects to be dealt with in situ by a user of the PC computer.

* * * * *